(12) United States Patent
Park

(10) Patent No.: US 11,275,526 B2
(45) Date of Patent: Mar. 15, 2022

(54) MEMORY CONTROLLER FOR DETERMINING CHANNEL INITIALIZATION TIME AND METHOD OF OPERATING THE SAME

(71) Applicant: SK hynix Inc., Icheon-si (KR)

(72) Inventor: Se Chang Park, Cheongju-si (KR)

(73) Assignee: SK hynix Inc., Icheon-si (KR)

( * ) Notice: Subject to any disclaimer, the term of this patent is extended or adjusted under 35 U.S.C. 154(b) by 381 days.

(21) Appl. No.: 16/430,208

(22) Filed: Jun. 3, 2019

(65) Prior Publication Data
US 2020/0133572 A1 Apr. 30, 2020

(30) Foreign Application Priority Data
Oct. 29, 2018 (KR) .......................... 10-2018-0130280

(51) Int. Cl.
*G06F 3/00* (2006.01)
*G06F 3/06* (2006.01)

(52) U.S. Cl.
CPC .......... *G06F 3/0659* (2013.01); *G06F 3/0604* (2013.01); *G06F 3/0632* (2013.01); *G06F 3/0673* (2013.01)

(58) Field of Classification Search
CPC ...... G06F 3/0659; G06F 3/0679; G06F 3/061; G06F 12/0246
USPC .......................................................... 711/154
See application file for complete search history.

(56) References Cited

U.S. PATENT DOCUMENTS

| 5,228,130 | A | * | 7/1993 | Michael | G06F 13/38 710/10 |
|---|---|---|---|---|---|
| 6,154,821 | A | * | 11/2000 | Barth | G06F 13/1694 711/170 |
| 2004/0160832 | A1 | * | 8/2004 | Janzen | G11C 11/4072 365/191 |
| 2005/0162934 | A1 | * | 7/2005 | Roohparvar | G11C 7/1045 365/189.05 |
| 2006/0184782 | A1 | * | 8/2006 | Zitlaw | G11C 16/32 713/1 |
| 2007/0214347 | A1 | * | 9/2007 | Rothman | G06F 12/0646 713/1 |
| 2009/0177946 | A1 | * | 7/2009 | Dasari | G06F 11/1044 714/763 |
| 2010/0070693 | A1 | * | 3/2010 | Conley | G06F 9/445 711/103 |

(Continued)

FOREIGN PATENT DOCUMENTS

| KR | 10-1036720 | 5/2011 |
|---|---|---|
| KR | 10-2017-0129516 | 11/2017 |

*Primary Examiner* — Titus Wong
(74) *Attorney, Agent, or Firm* — Perkins Coie LLP

(57) ABSTRACT

The technology disclosed in this patent document can be implemented in embodiments to provide a memory controller configured to control a memory device and a method of operating the memory controller and the memory device. The memory controller may control a memory device including a plurality of pages, and may include a command analysis unit configured to generate command information indicating a type of read command for a page selected from among the plurality of pages, and an initialization time decision unit configured to decide on a channel initialization time for initializing channels of a plurality of memory cells included in the selected page based on the command information.

20 Claims, 20 Drawing Sheets

(56) References Cited

U.S. PATENT DOCUMENTS

2012/0216059 A1\* 8/2012 Barth .................. G06F 13/1694
713/322

\* cited by examiner

| Temperature | Plane | Read Command | Offset |
|---|---|---|---|
| p1~p2°C | Multi | Cache Read | Offset11 |
| | | Page Read | Offset12 |
| | | Half Page Read | Offset13 |
| | Single | Cache Read | Offset14 |
| | | Page Read | Offset15 |
| | | Half Page Read | Offset16 |
| p2~p3°C | Multi | Cache Read | Offset21 |
| | | Page Read | Offset22 |
| | | Half Page Read | Offset23 |
| | Single | Cache Read | Offset24 |
| | | Page Read | Offset25 |
| | | Half Page Read | Offset26 |
| ⋮ | ⋮ | ⋮ | ⋮ |

MEMORY CONTROLLER FOR DETERMINING CHANNEL INITIALIZATION TIME AND METHOD OF OPERATING THE SAME

CROSS-REFERENCE TO RELATED APPLICATION

This patent document claims priority to and benefits of the Korean patent application number 10-2018-0130280 filed on Oct. 29, 2018, which is incorporated herein by reference in its entirety.

TECHNICAL FIELD

Various embodiments of the disclosed technology generally relate to an electronic device, and more particularly, to a memory controller and a method of operating the memory controller.

BACKGROUND

A storage device is a device that is capable of storing data in a storage medium. Computing devices such as a personal computer, a smartphone, or a tablet computer can use such storage devices to retain data files. Examples of the storage device include, for example, a hard disk drive (HDD), which uses a magnetic disk as the storage medium, and a solid state drive (SSD) or a memory card, which uses, as the storage medium, a semiconductor memory such as a nonvolatile memory.

The storage device implemented using semiconductor memories may include a plurality of memory devices and a memory controller which controls the memory devices to store and retrieve data in and from the memory devices. Such memory devices may be classified into a volatile memory and a nonvolatile memory. Representative examples of the nonvolatile memory include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), and a ferroelectric RAM (FRAM).

SUMMARY

Various embodiments of the disclosed technology relate to a storage device having an improved operating speed and a method of operating the storage device.

An embodiment of the disclosed technology may provide for a memory controller for controlling a memory device including a plurality of pages, wherein the memory controller is configured to execute a read command on the memory device. The memory controller may include a command analysis unit configured to generate command information indicating a type of the read command for a page selected from among the plurality of pages and an initialization time decision unit configured to decide on a channel initialization time for initializing channels of a plurality of memory cells included in the selected page based on the command information.

An embodiment of the disclosed technology may provide for a method of operating a memory controller, the memory controller controlling a memory device including a plurality of pages and being configured to execute a read command on the memory device. The method may include generating command information indicating a type of read command for a page selected from among the plurality of pages, and deciding on a channel initialization time for initializing channels of a plurality of memory cells included in the selected page when a read operation corresponding to the read command is performed based on the command information.

An embodiment of the disclosed technology may provide for a memory controller for controlling a memory device including a plurality of pages. The memory controller may include a command analysis unit configured to generate command information indicating a type of read command for a page selected from among the plurality of pages, and an initialization time decision unit configured to decide on a channel initialization time for initializing channels of a plurality of memory cells included in the selected page when a read operation corresponding to the read command is performed based on the command information.

An embodiment of the disclosed technology may provide for a method of operating a memory controller, the memory controller controlling a memory device including a plurality of pages. The method may include generating command information indicating a type of read command for a page selected from among the plurality of pages, and deciding on a channel initialization time for initializing channels of a plurality of memory cells included in the selected page when a read operation corresponding to the read command is performed based on the command information.

DETAILED DESCRIPTION

Figure 1:
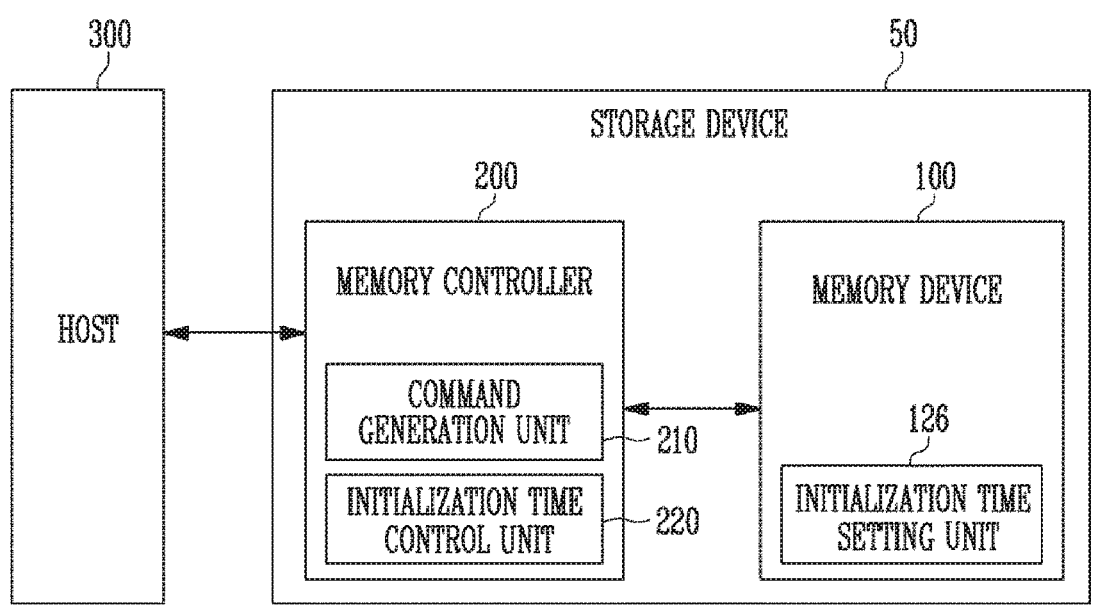
FIG. 1 is a block diagram illustrating an example of a storage device.

The technology disclosed in this patent document can be implemented in embodiments to provide a memory controller configured to control a memory device by adjusting a channel initialization time. Specific structural or functional descriptions in the embodiments of the present disclosure introduced in this specification or application are only for description of the embodiments of the present disclosure. The descriptions should not be construed as being limited to the embodiments described in the specification or application.

The present disclosure will not be described in detail based on embodiments. The present disclosure may, however, be embodied in many different forms and should not be construed as being limited to only the embodiments set forth herein, but should be construed as covering modifications, equivalents or alternatives falling within ideas and technical scopes of the present disclosure disclosed technology. However, this is not intended to limit the present disclosure disclosed technology to particular modes of practice, and it is to be appreciated that all changes, equivalents, and substitutes that do not depart from the spirit and technical scope of the present disclosure disclosed technology are encompassed in the present disclosure disclosed technology.

It will be understood that, although the terms "first" and/or "second" may be used herein to describe various elements, these elements should not be limited by these terms. These terms are only used to distinguish one element, from another element. For instance, a first element discussed below could be termed a second element without departing from the teachings of the present disclosure disclosed technology. Similarly, the second element could also be termed the first element.

It will be understood that when an element is referred to as being "coupled" or "connected" to another element, it can be directly coupled or connected to the other element or intervening elements may be present there between. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure disclosed technology, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure disclosed technology belongs. It will be further understood that terms used herein should be interpreted as having a meaning that is consistent with their meaning in the context of this specification and the relevant art and will not be interpreted in an idealized or overly formal sense unless expressly so defined herein.

Detailed description of functions and structures well known to those skilled in the art will be omitted to avoid obscuring the subject matter of the present disclosure disclosed technology. This aims to omit unnecessary description so as to make the subject matter of the present disclosure disclosed technology clear.

Various embodiments of the present disclosure disclosed technology will now be described more fully hereinafter with reference to the accompanying drawings, in which preferred embodiments of the present disclosure disclosed technology are illustrated, so that those of ordinary skill in the art can easily carry out the technical idea of the present disclosure disclosed technology.

FIG. 1 is a block diagram illustrating an example of a storage device.

Referring to FIG. 1, a storage device 50 may include a memory device 100 and a memory controller 200.

The storage device 50 may be a device that is used by a host 300, such as a mobile phone, a smartphone, an MP3 player, a laptop computer, a desktop computer, a game console, a television (TV), a tablet PC, or an in-vehicle infotainment system, to retain data files of the host 300.

The storage device 50 may be manufactured as any one of various types of storage devices depending on a host interface, which is a communication interface between the host 300 and its peripheral devices. For example, the storage device 50 may be implemented as any one of various types of storage devices, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal storage bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may be a storage space where data to be processed and/or instructions to be executed are stored, and the memory controller 200 may include the logic needed to read and write to the memory device 100. The memory device 100 may include a memory cell array including a plurality of memory cells each of which stores one or more data bits. In some implementations, the memory cell array may include multiple planes. Each plane may include a plurality of memory blocks. Each memory block may include a plurality of memory cells. A single memory block may include a plurality of pages. In an embodiment, a page may be a unit by which data is stored in the memory device 100 or by which data stored in the memory device 100 is read. A memory block may be a unit by which data is erased. In other words, read and program (write) operations are performed on a page basis, and erase operations are performed on a block basis. In some embodiments, a memory chip with multi-plane architecture can perform the same kind of operations concurrently to increase data throughput. In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a Low Power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM). In some embodiments of the disclosed technology, the memory device 100 may be a NAND flash memory, for example.

In an embodiment, the memory device 100 may be implemented as a three-dimensional (3D) array structure. The NAND flash memory can store information by adding or removing electrical charges to and from a charge storage layer therein. In an implementation of the disclosed technology, a conductive floating gate (FG) is used as the charge storage layer. In another implementation of the disclosed technology, the flash memory may be a charge trap flash (CTF) memory device in which the charge storage layer is formed of an insulating layer.

In an embodiment, each of the memory cells included in the memory device 100 may be implemented as a single-level cell (SLC) to store one bit of data per memory cell. Alternatively, each of the memory cells included in the memory device 100 may be implemented as a multi-level cell (MLC) to store two bits of data per memory cell. Each of the memory cells may be used as a triple-level cell (TLC) to store three bits of data per memory cell, or may be used as a quad-level cell (QLC) to store four bits of data per memory cell.

The memory device 100 may receive a command and an address from the memory controller 200 to access the area of the memory cell array, selected by the address. That is, the memory device 100 performs an operation corresponding to the command on the area selected by the address. For example, the memory device 100 may perform a write operation (i.e., program operation), a read operation, and an erase operation. During a program operation, the memory device 100 may write (program) data to the area selected by the address. During a read operation, the memory device 100 may read data from the area selected by the address. During an erase operation, the memory device 100 may erase data stored in the area selected by the address.

In an embodiment, the memory device 100 may include an initialization time setting unit 126. In a flash memory such as a NAND flash memory, a plurality of memory cell transistors is connected in series to form a memory cell string. Each cell string is coupled to a bit line, and word lines are coupled to memory cell transistors of each memory cell string in parallel. In a read operation where a certain word line coupled to a target memory cell is selected to read, all word lines except the selected word line to read are set to a high voltage above threshold voltages of programmed memory cells to allow all channels of the unselected memory cell transistors to be electrically connected to each other. If the selected memory cell connected to the selected word line is a programmed memory cell having a higher threshold voltage than a read voltage applied to the selected word line, all channels of both the selected and unselected memory cells become electrically connected to each other, allowing electrical current to flow to the bit line through the channels of the selected and unselected memory cells. These channels of memory cells are coupled to I/O channels to communicate with a memory controller and/or other peripheral areas such as page buffers.

The initialization time setting unit 126 may set a channel initialization time (CIT) for initializing the channels of the memory cells using channel initialization time information CIT_INF. The channel initialization time information CIT_INF may be provided from the memory controller 200. The channel initialization time information CIT_INF may include information for setting a time during which the channels of the memory cells are initialized before starting to read data from the selected memory cell in a read operation.

The initialization time setting unit 126 may store parameter data in a register included in the memory device 100 so as to set an optimal channel initialization time (CIT) for the memory cells. In the context of this patent document, the words "optimal" or "optimized" used in conjunction with channel initialization time (CIT) is used to indicate values that provide a better performance for the memory device (e.g., higher reliability, fewer read errors, etc.) than existing values. In this sense, the words optimal may or may not convey the best possible performance achievable by the memory device. The parameter data may be data obtained based on a preset default time and an offset. For example, the parameter data may be obtained by summing the preset default time and the offset. In cases where the preset default time is the maximum possible channel initialization time, the channel initialization time information CIT_INF may be used to subtract the offset from the preset default time. In cases where the preset default time is the minimum possible channel initialization time, the channel initialization time information CIT_INF may be used to add the offset to the preset default time. In an implementation, the offset can indicate a time value to be subtracted from or added to the preset default time. The preset default time may be an initial channel initialization time (CIT) to be equally applied to all read operations when the memory device 100 performs a read operation. The preset default time may be stored in the memory device 100. The offset may be a difference between the preset default time and the optimal channel initialization time (CIT). The offset may have different values for respective read operations. Further, the offset may have different values depending on temperature ranges within which the temperature of the memory device 100 falls.

The memory device 100 may be provided with the parameter data together with a set-parameter command and a set-parameter address from the memory controller 200. The memory device 100 may store the parameter data in a register corresponding to the set-parameter address in response to the set-parameter command. The parameter data may be used to determine the time required for initialization of the channels of memory cells when the memory device 100 performs a read operation.

The memory device 100 may perform program operations or erase operations using set operating voltages under the control of the memory controller 200.

The memory controller 200 may control the overall operation of the storage device 50.

When power is applied to the storage device 50, the memory controller 200 may run firmware. When the memory device 100 is a flash memory device, the memory controller 200 may run firmware such as a Flash Translation Layer (FTL) for controlling communication between the host 300 and the memory device 100.

In an embodiment, the memory controller 200 may receive data and a logical block address (LBA) from the host 300, and may translate the logical block address (LBA) into a physical block address (PBA) indicating the address of memory cells which are included in the memory device 100 and in which data is to be stored. Further, the memory controller 200 may store a logical-physical address mapping table, which configures mapping relationships between logical block addresses (LBA) and physical block addresses (PBA), in a buffer memory (not illustrated).

The memory controller 200 may control the memory device 100 so that a program operation, a read operation or an erase operation is performed in response to a request received from the host 300. During a program operation, the memory controller 200 may provide a program command, a physical block address (PBA), and data to the memory device 100. During a read operation, the memory controller 200 may provide a read command and a physical block address (PBA) to the memory device 100. During an erase operation, the memory controller 200 may provide an erase command and a physical block address (PBA) to the memory device 100.

In an embodiment, the memory controller 200 may autonomously generate a program command, an address, and data without receiving a request from the host 300, and may transmit the generated program command, address, and data to the memory device 100. For example, the memory controller 200 may provide commands, addresses, and data to the memory device 100 so as to perform background operations, such as a program operation for wear leveling and a program operation for garbage collection.

In an embodiment, the memory device 200 may include a command generation unit 210. The command generation unit 210 may generate a command for an operation to be performed by the memory device 100 in response to a request received from the host 300. The operation to be performed by the memory device 100 may be any one of a program operation, a read operation, and an erase operation. The memory device 100 may perform an operation corresponding to the command generated by the command generation unit 210.

In an embodiment, the memory device 200 may include an initialization time control unit 220. The initialization time control unit 220 may be provided with the command generated by the command generation unit 210. The command generated by the command generation unit 210 may be a read command. The memory device 100 may perform a read operation on a page selected from among the plurality of pages included in the memory device 100 in response to the read command. When the read operation corresponding to the read command is performed, the initialization time control unit 220 may control the channel initialization time (CIT) for initializing the channels of the memory cells included in the memory device 100.

The initialization time control unit 220 may control the channel initialization time (CIT) for the memory cells based on the types of read command. The types of read command may include a multi-plane read command, a single plane read command, a cache read command, an entire page read command, a half page read command, etc.

The half page read command may be a command for reading one of a first half page and a second half page included in a selected page. The first half page may include first memory cells among the memory cells included in the selected page, and the second half page may include second memory cells among the memory cells included in the selected page.

The initialization time control unit 220 may provide channel initialization time information CIT_INF, which is information about the channel initialization time (CIT) for the memory cells, to the memory device 100. The memory device 100 may be provided with a preset value for a channel initialization time. The memory device 100 may update the value for the channel initialization time based on the channel initialization time information CIT_INF. The initialization time control unit 220 may provide the set-parameter command, the set-parameter address, and the set-parameter data to the memory device 100 to update the set value for the channel initialization time.

In an embodiment, the memory controller 200 may control at least two memory devices 100. In this case, the memory controller 200 may control the memory devices 100 in an interleaved manner to improve operating performance.

The host 300 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
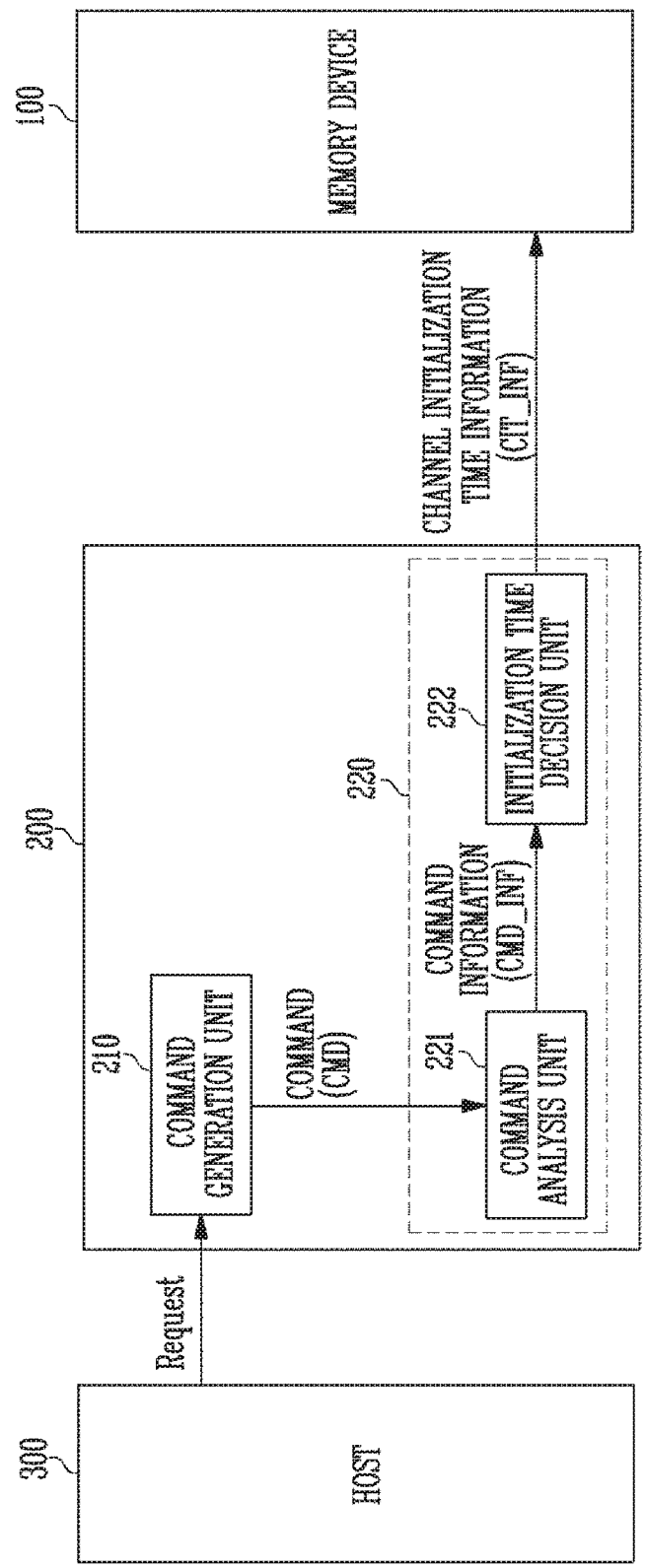
FIG. 2 is a diagram illustrating an example of the structure of an initialization time control unit of FIG. 1.

FIG. 2 is a diagram illustrating an example of the structure of the initialization time control unit of FIG. 1.

Referring to FIG. 2, the memory controller 200 may include a command generation unit 210 and an initialization time control unit 220. The initialization time control unit 220 may include a command analysis unit 221 and an initialization time decision unit 222.

The command generation unit 210 may generate a command CMD for an operation to be performed by a memory device 100 in response to a request received from a host 300. The operation to be performed by the memory device 100 may be any one of a program operation, a read operation, and an erase operation. The memory device 100 may perform an operation corresponding to the command generated by the command generation unit 210.

The command analysis unit 221 may receive the command CMD generated by the command generation unit 210. The command CMD may be a read command for reading data stored in the memory device 100. The command analysis unit 221 may generate command information CMD_INF depending on the types of the received command CMD. The types of the received read command may include a multi-plane read command, a single plane read command, a cache read command, a normal read command, an entire page read command, a half page read command, etc. Therefore, the command analysis unit 221 may generate command information CMD_INF indicating the type of read command for a selected page or selected pages among the plurality of pages.

The command analysis unit 221 may provide the command information CMD_INF to the initialization time decision unit 222.

In an embodiment, the command information CMD_INF may include multi-plane read command information or single plane read command information. The multi-plane read command information may be information indicating that the read command is a command for reading pages included in at least two of multiple planes. The single plane read command information may be information indicating that the read command is a command for reading a page included in any one of multiple planes.

In an embodiment, the command information CMD_INF may include cache read command information or normal read command information. The cache read command information may be information about a command for cache read operations where data read out from a selected page is stored in a page buffer of the memory device 100 while previous data, stored in a cache buffer of the memory device 100, is being output to the memory controller 200. The normal read command information may be information about a command for normal read operations where, after the previous data, stored in the page buffer, has been output to the memory controller 200, the data in the selected page is stored in the page buffer.

In an embodiment, the command information CMD_INF may include entire page read command information or half page read command information. Each page may be composed of a first half page and a second half page.

In an example implementation where memory cells belonging to a corresponding page are grouped into a first half page and a second half page, the first half page may include first memory cells, and the second half page may include second memory cells. The second memory cells may be arranged to alternate with the first memory cells. In this case, the first memory cells may be coupled to even-numbered bit lines, respectively, and the second memory cells may be coupled to odd-numbered bit lines, respectively. In an embodiment, the first memory cells and the second memory cells may be sequentially arranged.

The entire page read command information may include information about a command for reading both the first and second half pages included in a selected page. The half page read command information may be information about a command for reading any one of the first half page and the second half page included in the selected page.

In an embodiment, the command information CMD_INF may include information corresponding to two or more of multi-plane read command information, single plane read command information, cache read command information, entire page read command information, and half page read command information. When the command information CMD_INF includes two or more pieces of read command information, the initialization time decision unit 222 may generate channel initialization time information CIT_INF for the memory cells based on the two or more pieces of read command information.

The initialization time decision unit 222 may decide on a channel initialization time (CIT) based on the command information CMD_INF. In an implementation, the initialization time decision unit 222 may decide on the channel initialization time (CIT) for initializing the channels of a plurality of memory cells included in a selected page during a read operation corresponding to the read command.

For a storage device including channels for data readout, channel initialization is needed before performing read operations. In an example implementation, the same channel initialization time CIT is applied for all of the individual memory devices 100 regardless of the type of read command generated in response to a request from the host 300, and thus the channel initialization time CIT for all the memory cells would be set to be equal. In this example implementation, since channel initialization times (CIT) required to initialize the channels of memory cells are different from each other depending on the types of read command, the memory device 100 sets the longest channel initialization time as the channel initialization time (CIT) for memory cells.

The channel initialization times (CIT) set to the longest channel initialization time can impact on a read time tR during which the read operation is performed. That is, an unnecessary read time tR may be consumed. In contrast, when the channel initialization time is too short, hot carrier injection (HCI) may occur. Therefore, there is a need to set optimal channel initialization times CIT for respective read commands to avoid hot carrier injection (HCI).

The issues associated with the channel initialization for memory cells may be even more important especially when the memory device 100 has a three-dimensional (3D) array structure. When the memory device 100 has a 3D array structure, each memory cell is surrounded by more memory cells than 2D array structure, and this leads to an increase in the time required to initialize the channels of the memory cells. Therefore, when the memory device 100 has a 3D array structure, it is important to set the optimal channel initialization time (CIT).

In an embodiment, the initialization time decision unit 222 may generate the channel initialization time information CIT_INF using the command information CMD_INF provided from the command analysis unit 221. The channel initialization time information CIT_INF may include information about optimal channel initialization times (CIT) that are decided based on the types of read command. The generated channel initialization time information CIT_INF may be provided to the memory device 100.

When the memory device 100 performs a read operation corresponding to the multi-plane read command or the single plane read command, the channel initialization time information CIT_INF may include information about optimal channel initialization times (CIT). When the command information CMD_INF includes multi-plane read command information, the channel initialization time (CIT) is set to a longer time than that when the command information CMD_INF includes single plane read command information.

When the memory device 100 performs a read operation corresponding to the cache read command or the normal read command, the channel initialization time information CIT_INF may include information about an optimal channel initialization time (CIT). When the command information CMD_INF includes cache read command information, the channel initialization time (CIT) is set to a longer time than that when the command information CMD_INF includes normal read command information.

When the memory device 100 performs a read operation corresponding to the entire page read command or the half page read command, the channel initialization time information CIT_INF may include information about an optimal channel initialization time (CIT). When the command information CMD_INF includes entire page read command information, the channel initialization time (CIT) is set to a longer time than that when the command information CMD_INF includes half page read command information.

The channel initialization time information CIT_INF will be described in detail below with reference to FIG. 3.

Figure 3:
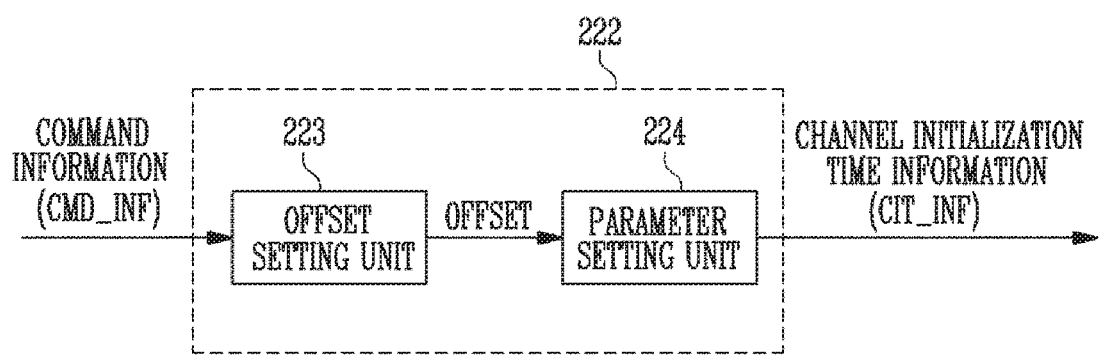
FIG. 3 is a diagram illustrating an example of the structure of an initialization time decision unit of FIG. 2.

FIG. 3 is a diagram illustrating an example of the structure of the initialization time decision unit of FIG. 2.

Referring to FIG. 3, the initialization time decision unit 222 may include an offset setting unit 223 and a parameter setting unit 224.

The offset setting unit 223 may set an offset for deciding on a channel initialization time (CIT) using command information CMD_INF provided from the command analysis unit 221. The offset setting unit 223 may store an offset table including different offsets corresponding to the types of read command. The offset table may include different offsets corresponding to a plurality of temperature ranges.

The offset setting unit 223 may select one of different offsets stored in the offset table. In an embodiment of the disclosed technology, the offset selection can be made based on the command information CMD_INF and/or temperature ranges. In an implementation, the offset setting unit 223 may select one of offsets by mapping the command information CMD_INF and the current temperature to one of the offset in the offset table.

The selected offset may be provided to the parameter setting unit 224. The offset provided to the parameter setting unit 224 may be used to generate channel initialization time information CIT_INF.

The parameter setting unit 224 may generate the channel initialization time information CIT_INF based on the offset. In an embodiment of the disclosed technology, the channel initialization time information CIT_INF may be obtained based on a preset default time and the offset received from the offset setting unit 223. The preset default time may be the longest channel initialization time (CIT) among channel initialization times depending on read commands. The time obtained based on the preset default time and the offset may be an optimal channel initialization time (CIT) when a read operation corresponding to each read command is performed. In an implementation, the offset can indicate a time value to be subtracted from the preset default time. For example, the channel initialization time information CIT_INF may be used to adjust (e.g., reduce) the preset default time based on the offset. The parameter setting unit 224 may provide the channel initialization time information CIT_INF to the memory device 100.

Figure 4:
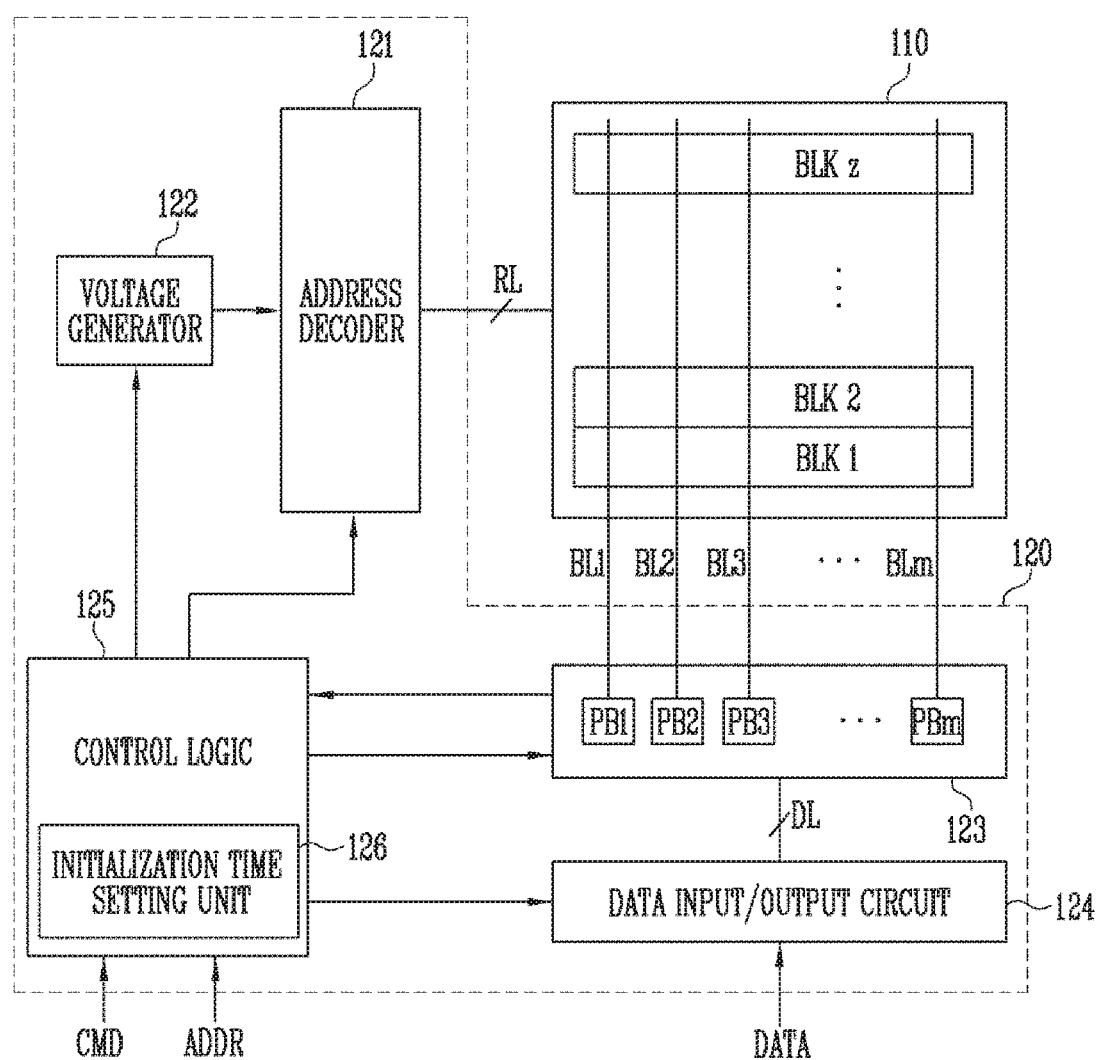
FIG. 4 is a diagram illustrating an example of the structure of a memory device of FIG. 1.

FIG. 4 is a diagram illustrating an example of the structure of the memory device of FIG. 1.

Referring to FIG. 4, the memory device 100 may include a memory cell array 110, a peripheral circuit 120 including a control logic 125.

The memory cell array 110 includes a plurality of memory blocks BLK1 to BLKz. The memory blocks BLK1 to BLKz are coupled to an address decoder 121 through row lines RL and are coupled to a read and write circuit 123 through bit lines BL1 to BLm. Each of the memory blocks BLK1 to BLKz includes a plurality of memory cells. In an embodiment, the plurality of memory cells may be nonvolatile memory cells.

The memory cells included in the memory cell array 110 may be divided into a plurality of blocks, and some of the plurality of blocks may be used for different purposes than other blocks. System information including various types of setting information required to control the memory device 100 may be stored in the plurality of blocks.

Each of the first to z-th memory blocks BLK1 to BLKz includes a plurality of cell strings. First to m-th cell strings are respectively coupled to the first to m-th bit lines BL1 to BLm. Each of the first to m-th cell strings includes a drain select transistor, a plurality of series-coupled memory cells, and a source select transistor. The drain select transistor DST is coupled to a drain select line DSL. First to n-th memory cells are respectively coupled to first to n-th word lines WL1 to WLn. The source select transistor SST is coupled to a source select line SSL. A drain of the drain select transistor DST is coupled to the corresponding bit line. The drain select transistors of the first to m-th cell strings are respectively coupled to the first to m-th bit lines BL1 to BLm. A source of the source select transistor SST is coupled to a common source line CSL. In an embodiment, the common source line CSL may be coupled in common to the first to z-th memory blocks BLK1 to BLKz. The drain select line DSL, the first to n-th word lines WL1 to WLn, and the source select line SSL are included in the row lines RL. The drain select line DSL, the first to n-th word lines WL1 to WLn, and the source select line SSL are controlled by the address decoder 121. The common source line CSL is controlled by the control logic 125. The first to m-th bit lines BL1 to BLm are controlled by the read and write circuit 123.

The peripheral circuit 120 may include the address decoder 121, a voltage generator 122, the read and write circuit 123, a data input/output circuit 124, and the control logic 125.

The address decoder 121 is coupled to the memory cell array 110 through the row lines RL. The address decoder 121 may be operated under the control of the control logic 125. The address decoder 121 receives addresses ADDR through the control logic 125.

In an embodiment, the program operation and the read operation of the memory device 100 are each performed on a page basis.

During the program and read operations, the addresses ADDR received by the control logic 125 may include a block address and a row address. The address decoder 121 may decode the received addresses ADDR to identify the block address to be accessed and selects one of the memory blocks BLK1 to BLKz based on the block address.

The address decoder 121 may decode the received addresses ADDR to identify the row address to be accessed and, based on the row address, applies voltages, provided from the voltage generator 122, to the row lines RL and then selects one word line of the selected memory block.

During an erase operation, the addresses ADDR include a block address. The address decoder 121 may identify the block address and select one memory block based on the block address. An erase operation may be performed on all or part of one memory block.

During a partial erase operation, the addresses ADDR may include block and row addresses. The address decoder 121 selects one of the memory blocks BLK1 to BLKz in response to the decoded block address.

The address decoder 121 may decode the row addresses among the received addresses ADDR. In response to the decoded row addresses, the address decoder 121 applies voltages, provided from the voltage generator 122, to the row lines RL and then selects at least one word line of the selected memory block.

In an embodiment, the address decoder 121 may include a block decoder, a word line decoder, and an address buffer, etc.

The voltage generator 122 may generate a plurality of voltages using an external supply voltage provided to the memory device 100. The voltage generator 122 is operated under the control of the control logic 125.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate a plurality of voltages using the external supply voltage or the internal supply voltage. For example, the voltage generator 122 may include a plurality of pumping capacitors for receiving the internal supply voltage, and may generate a plurality of voltages by selectively enabling the plurality of pumping capacitors under the control of the control logic 125. The generated voltages are applied to word lines selected by the address decoder 121.

During a program operation, the voltage generator 122 may generate a high-voltage program voltage pulse and a pass voltage pulse lower than the program voltage pulse. During a read operation, the voltage generator 122 may generate a read voltage and a pass voltage higher than the read voltage. During an erase operation, the voltage generator 122 may generate an erase voltage.

The read and write circuit 123 includes first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm are operated under the control of the control logic 125.

The first to m-th page buffers PB1 to PBm perform data communication with the data input/output circuit 124. During a program operation, the first to m-th page buffers PB1 to PBm receive data to be stored DATA through the data input/output circuit 124 and data lines DL.

During a program operation, the first to m-th page buffers PB1 to PBm may transfer the data, received through the data input/output circuit 124, to selected memory cells through the bit lines BL1 to BLm when a program voltage pulse is applied to each selected word line. The memory cells in the selected page are programmed based on the transferred data. Memory cells coupled to a bit line to which a program permission voltage (e.g., a ground voltage) is applied may have increased threshold voltages as a result of the application of the program voltage pulse. Threshold voltages of memory cells coupled to a bit line to which a program inhibition voltage (e.g., a power supply voltage) is applied may be left unchanged due to the program inhibition voltage. During a program verify operation, the first to m-th page buffers may read page data from the selected memory cells through the bit lines BL1 to BLm.

During a read operation, the read and write circuit 123 may read data from the memory cells in the selected page through the bit lines BL, and may output the read data to the data input/output circuit 124. During an erase operation, the read and write circuit 123 may allow the bit lines BL to float.

In an embodiment, the read and write circuit 123 may include a column select circuit.

The data input/output circuit 124 is coupled to the first to m-th page buffers PB1 to PBm through the data lines DL. The data input/output circuit 124 is operated in response to control signals of the control logic 125. During a program operation, the data input/output circuit 124 receives, from an external controller (not illustrated), data to be stored in the memory cells.

The control logic 125 is coupled to the address decoder 121, the voltage generator 122, the read and write circuit 123, and the data input/output circuit 124. The control logic 125 may control the overall operation of the memory device 100. The control logic 125 receives a command CMD and addresses ADDR from the external controller. The control logic 125 may control the address decoder 121, the voltage generator 122, the read and write circuit 123, and the data input/output circuit 124 in response to the command CMD.

In an embodiment, the control logic 125 may include an initialization time setting unit 126.

The initialization time setting unit 126 may be provided with channel initialization time information CIT_INF from the memory controller 200. The channel initialization time information CIT_INF may include information about time consumed in initializing memory cells included in a selected page during a read operation.

The memory device 100 may store a preset default time. The preset default time may be the channel initialization time (CIT) to be equally applied to all read operations when the memory device 100 performs a read operation. However, an optimal channel initialization time (CIT) required in order to initialize the channels of memory cells may differ depending on the type of read command. Therefore, the initialization time setting unit 126 may provide channel initialization time information CIT_INF, as parameter data, to the memory device 100 in order to set the optimal channel initialization time (CIT). The parameter data may be data obtained by summing the preset default time and an offset received from an offset setting unit 223 (see FIG. 3). When the parameter data provided to the memory device 100 is stored in the memory device 100, the memory device 100 may set the optimal channel initialization time (CIT) corresponding to a read operation during the read operation. That is, the memory device 100 may initialize the channels of the memory cells during the channel initialization time (CIT) corresponding to the parameter data.

The memory device 100 may perform an optimal read operation using the stored parameter data during the read operation.

Figure 5:
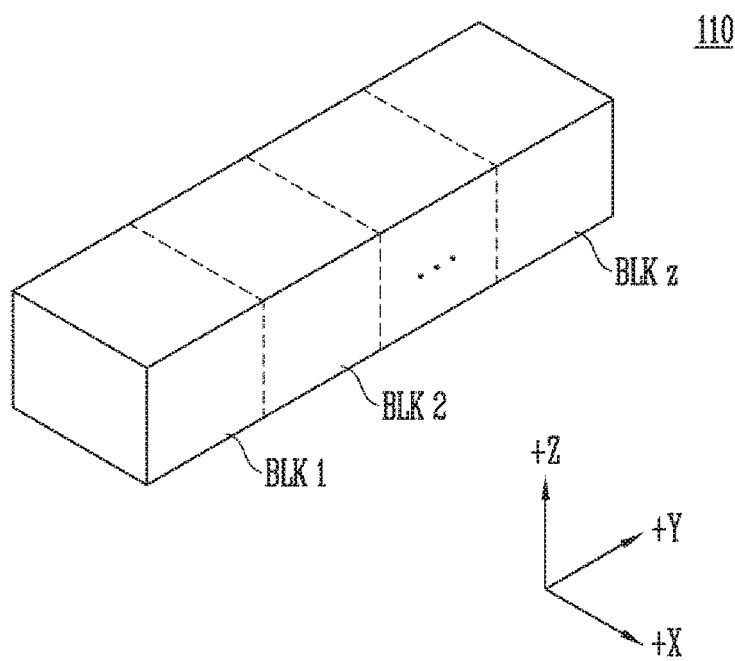
FIG. 5 is a diagram illustrating an example of a memory cell array of FIG. 4.

FIG. 5 is a diagram illustrating an example of the memory cell array of FIG. 4.

Referring to FIG. 5, the memory cell array 110 includes a plurality of memory blocks BLK1 to BLKz. In some embodiments of the disclosed technology, each memory block may have a three-dimensional (3D) structure. Each memory block includes a plurality of memory cells stacked on a substrate. Such memory cells are arranged in a positive X (+X) direction, a positive Y (+Y) direction, and a positive Z (+Z) direction. The structure of each memory block will be described in detail below with reference to FIGS. 6 and 7.

Figure 6:
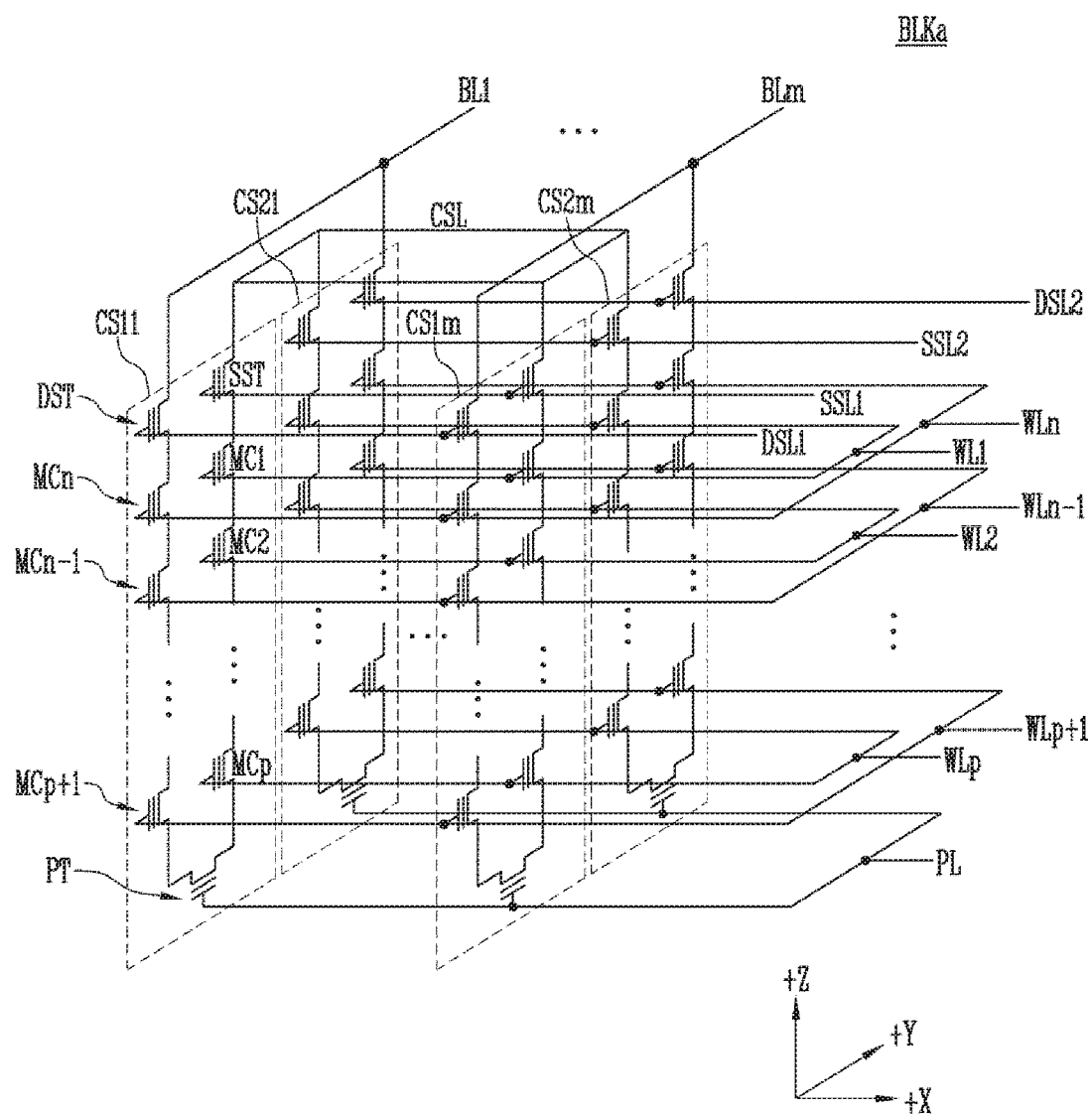
FIG. 6 is a circuit diagram illustrating any one memory block BLKa of memory blocks BLK1 to BLKz of FIG. 5.

FIG. 6 is a circuit diagram illustrating any one memory block BLKa of the memory blocks BLK1 to BLKz of FIG. 5.

Referring to FIG. 6, the memory block BLKa includes a plurality of cell strings CS11 to CS1$m$ and CS21 to CS2$m$. In an embodiment, each of the cell strings CS11 to CS1$m$ and CS21 to CS2$m$ may be formed in a 'U' shape. In the memory block BLKa, m cell strings are arranged in a row direction (i.e. a positive (+) X direction). In FIG. 6, two cell strings are illustrated as being arranged in a column direction (i.e. a positive (+) Y direction). However, this illustration is offered for explanatory purposes only, and thus it will be understood that three or more cell strings may be arranged in the column direction.

Each of the plurality of cell strings CS11 to CS1m and CS21 to CS2m includes at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided to each cell string. In an embodiment, a pillar for providing at least one of the channel layer, the tunneling insulating layer, the charge storage layer, and the blocking insulating layer may be provided to each cell string.

The source select transistor SST of each cell string is connected between the common source line CSL and memory cells MC1 to MCp.

In an embodiment, the source select transistors of cell strings arranged in the same row are coupled to a source select line extending in a row direction, and source select transistors of cell strings arranged in different rows are coupled to different source select lines. In FIG. 6, source select transistors of cell strings CS11 to CS1m in a first row are coupled to a first source select line SSL1. The source select transistors of cell strings CS21 to CS2m in a second row are coupled to a second source select line SSL2.

In an embodiment, source select transistors of the cell strings CS11 to CS1m and CS21 to CS2m may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are sequentially arranged in a direction opposite a positive (+) Z direction and are connected in series between the source select transistor SST and the pipe transistor PT. The p+1-th to n-th memory cells MCp+1 to MCn are sequentially arranged in the +Z direction and are connected in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

A gate of the pipe transistor PT of each cell string is coupled to a pipeline PL.

The drain select transistor DST of each cell string is connected between the corresponding bit line and the memory cells MCp+1 to MCn. The cell strings in a row direction are coupled to drain select lines extending in a row direction. Drain select transistors of cell strings CS11 to CS1m in the first row are coupled to a first drain select line DSL1. Drain select transistors of cell strings CS21 to CS2m in a second row are coupled to a second drain select line DSL2.

Cell strings arranged in a column direction are coupled to bit lines extending in a column direction. In FIG. 6, cell strings CS11 and CS21 in a first column are coupled to a first bit line BL1. Cell strings CS1m and CS2m in an m-th column are coupled to an m-th bit line BLm.

The memory cells coupled to the same word line in cell strings arranged in a row direction constitute a single page. For example, memory cells coupled to the first word line WL1, among the cell strings CS11 to CS1m in the first row, constitute a single page. Memory cells coupled to the first word line WL1, among the cell strings CS21 to CS2m in the second row, constitute a single additional page. Cell strings arranged in the direction of a single row may be selected by selecting any one of the drain select lines DSL1 and DSL2. A single page may be selected from the selected cell strings by selecting any one of the word lines WL1 to WLn.

In an embodiment, even-numbered bit lines and odd bit lines, instead of first to m-th bit lines BL1 to BLm, may be provided. Further, even-numbered cell strings, among the cell strings CS11 to CS1m or CS21 to CS2m arranged in a row direction, may be coupled to the even-numbered bit lines, respectively, and odd-numbered cell strings, among the cell strings CS11 to CS1m or CS21 to CS2m arranged in the row direction, may be coupled to the odd-numbered bit lines, respectively.

In an embodiment, one or more of the first to n-th memory cells MC1 to MCn may be used as dummy memory cells. For example, one or more dummy memory cells are provided to reduce an electric field between the source select transistor SST and the memory cells MC1 to MCp. Alternatively, the one or more dummy memory cells are provided to reduce an electric field between the drain select transistor DST and the memory cells MCp+1 to MCn. As more dummy memory cells are provided, the reliability of the operation of the memory block BLKa is improved, but the size of the memory block BLKa is increased. As fewer dummy memory cells are provided, the size of the memory block BLKa is reduced, but the reliability of the operation of the memory block BLKa may be deteriorated.

In order to efficiently control the one or more dummy memory cells, each of the dummy memory cells may have a required threshold voltage. Before or after the erase operation of the memory block BLKa is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have threshold voltages required for an efficient control of the dummy memory cells.

Figure 7:
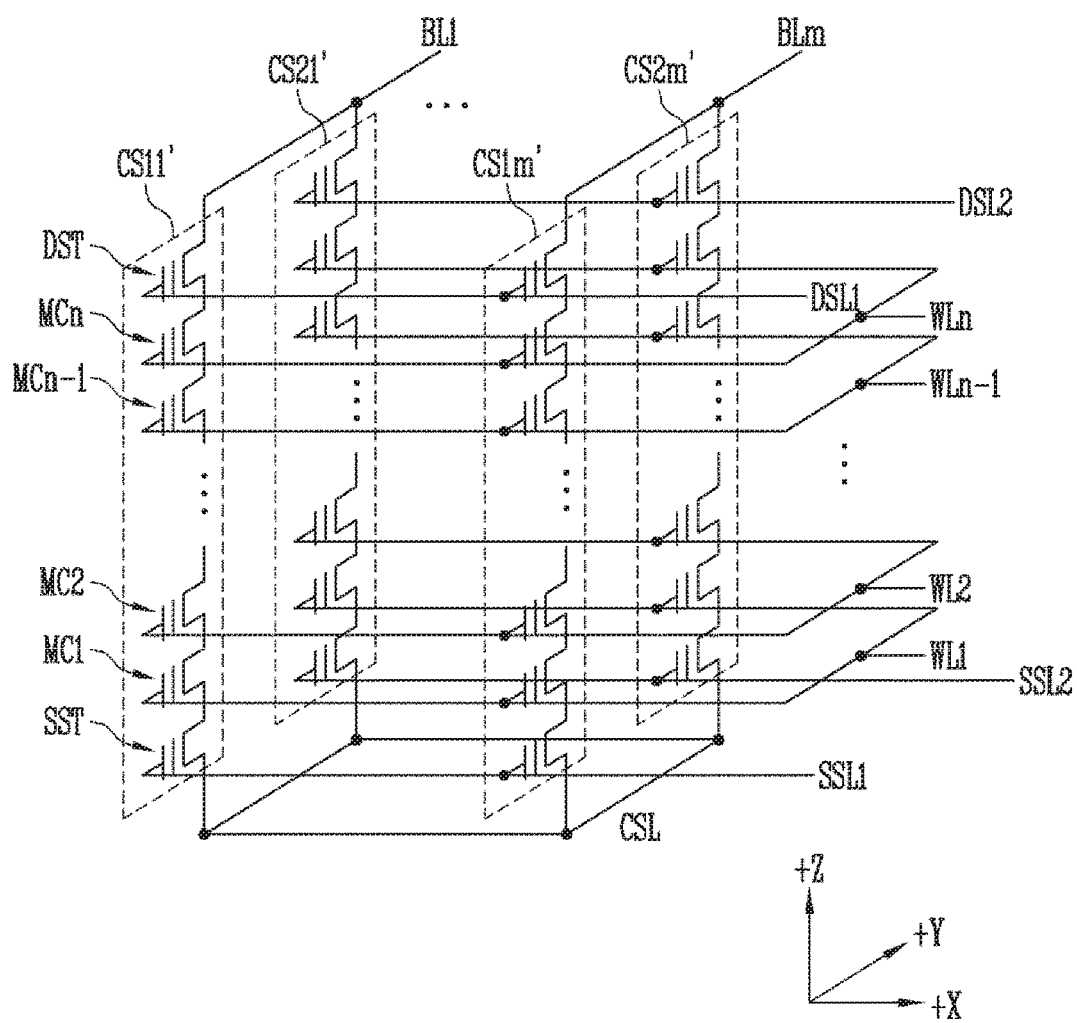
FIG. 7 is a circuit diagram illustrating an example of any one memory block BLKb of the memory blocks BLK1 to BLKz of FIG. 5.

FIG. 7 is a circuit diagram illustrating an example of any one memory block BLKb of the memory blocks BLK1 to BLKz of FIG. 5.

Referring to FIG. 7, the memory block BLKb includes a plurality of cell strings CS11' to CS1m' and CS21' to CS2m'. Each of the plurality of cell strings CS11' to CS1m' and CS21' to CS2m' extends in a positive Z (+Z) direction. Each of the cell strings CS11' to CS1m' and CS21' to CS2m' includes at least one source select transistor SST, first to n-th memory cells MC1 to MCn, and at least one drain select transistor DST, which are stacked on a substrate (not illustrated) below the memory block BLKb.

The source select transistor SST of each cell string is connected between a common source line CSL and memory cells MC1 to MCn. The source select transistors of cell strings arranged in the same row are coupled to the same source select line. Source select transistors of cell strings CS11' to CS1m' arranged in a first row are coupled to a first source select line SSL1. Source select transistors of cell strings CS21' to CS2m' arranged in a second row are coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are connected in series between the source select transistor SST and the drain select transistor DST. The gates of the first to n-th memory cells MC1 to MCn are coupled to first to n-th word lines WL1 to WLn, respectively.

The drain select transistor DST of each cell string is connected between the corresponding bit line and the memory cells MC1 to MCn. Drain select transistors of cell strings arranged in a row direction are coupled to drain select lines extending in a row direction. The drain select transistors of the cell strings CS11' to CS1m' in the first row are coupled to a first drain select line DSL1. The drain select transistors of the cell strings CS21' to CS2m' in the second row are coupled to a second drain select line DSL2.

As a result, the memory block BLKb of FIG. 7 has an equivalent circuit similar to that of the memory block BLKa of FIG. 6 except that a pipe transistor PT is excluded from each cell string.

In an embodiment, even-numbered bit lines and odd-numbered bit lines, instead of first to m-th bit lines BL1 to BLm, may be provided. Further, even-numbered cell strings, among the cell strings CS11' to CS1m' or CS21' to CS2m' arranged in a row direction, may be coupled to the even-numbered bit lines, respectively, and odd-numbered cell strings, among the cell strings CS11' to CS1m' or CS21' to CS2m' arranged in the row direction, may be coupled to the odd-numbered bit lines, respectively.

In an embodiment, one or more of the first to n-th memory cells MC1 to MCn may be used as dummy memory cells. For example, the one or more dummy memory cells are provided to reduce an electric field between the source select transistor SST and the memory cells MC1 to MCn. Alternatively, the one or more dummy memory cells are provided to reduce an electric field between the drain select transistor DST and the memory cells MC1 to MCn. These dummy memory cells can be used to improve the reliability of the operation of the memory block BLKb, but they can negatively impact on the size of the memory block BLKb.

In order to efficiently control the one or more dummy memory cells, each of the dummy memory cells may have a required threshold voltage. Before or after the erase operation of the memory block BLKb is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have the threshold voltages required for an efficient control of the dummy memory cells.

Figure 8:
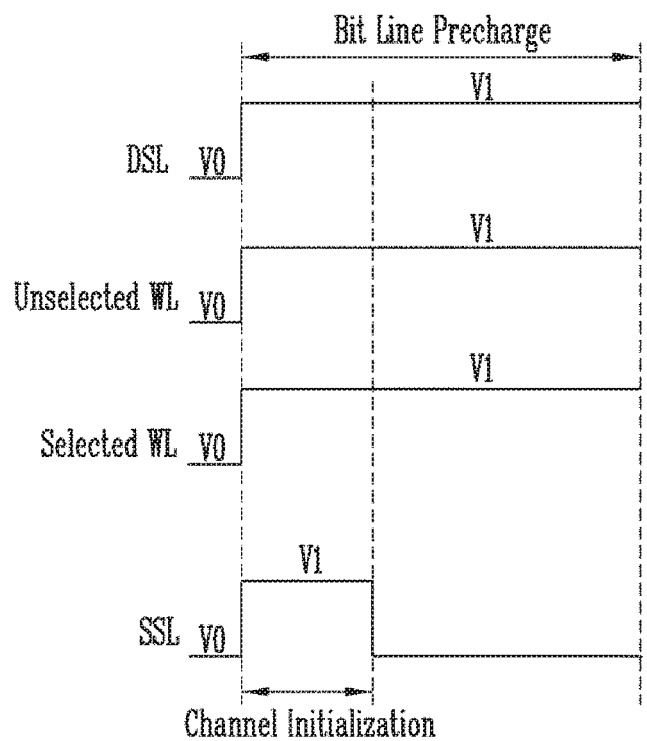
FIG. 8 is a diagram illustrating an example method of initializing the channels of memory cells based on an embodiment of the disclosed technology.

FIG. 8 is a diagram illustrating an example method of initializing the channels of memory cells based on an embodiment of the disclosed technology.

Referring to FIG. 8, in order to read data stored in a selected page during a read operation, a bit line coupled to memory cells included in the selected page may be precharged (i.e., bit line precharge operation). In FIG. 8, only a bit line precharge period is illustrated for explanatory purposes. In an implementation of the disclosed technology, an additional operation of sensing a bit line voltage and storing data may be performed after the bit line precharge period. In some embodiments of the disclosed technology, after bit line precharge has been performed, the memory device 100 may apply a read voltage to a word line coupled to memory cells included in a selected page to activate the selected page to be read, and may apply a pass voltage to the remaining unselected word lines. The pass voltage may be used to turn on all memory cells regardless of the threshold voltages of the memory cells. As such, the memory device 100 applies pass voltages to the unselected word lines so that the bit line may be electrically connected to the selected memory cell of the selected page and the threshold voltages of the selected memory cell can be read out through the bit line. A page buffer PB may temporarily store data read from the selected memory cell by sensing a voltage change in the bit line.

Channel initialization for memory cells may be performed to reduce a time during which the data is read out from the selected memory cell in the read operation. The channel initialization time (CIT) needs to be sufficiently long to avoid or minimize the risk of a hot carrier injection. When the hot carrier injection occurs, a read operation may need to be performed several times to read out data from the selected memory cell, thereby lengthening the time during which the entire read operation is completed. For these reasons, the memory device 100 may set a channel initialization time (CIT) based on a read operation requiring the longest channel initialization time (CIT). In an example implementation, the same channel initialization time (CIT) may be set for all read operations.

During the read operation, channels of memory cells included in the selected page may be initialized while a bit line precharge is being performed.

In some embodiments of the disclosed technology, before a bit line precharge operation is performed, a 0-th voltage V0 may be applied to a selected word line WL coupled to memory cells included in the selected page, unselected word lines WL (all word lines except the selected word line), a drain select line DSL, and a source select line SSL. Here, the 0-th voltage V0 may be a ground voltage GND (0 V). When the bit line precharge operation is initiated, a first voltage V1 may be applied to each line. The first voltage V1 may be a voltage for turning on all memory cells regardless of the threshold voltages of the memory cells.

The channel initialization for memory cells may be performed as follows. The first voltage V1 may be applied to the selected word line WL, the unselected word lines WL, and the drain select line DSL during a bit line precharge period. The first voltage V1 may be applied to the source select line SSL only during the time in which channel initialization is being performed. When the first voltage V1 is applied to the source select line SSL, a source select transistor SST is turned on and all electrical charges present in the channels of the memory cells are discharged, and thus the channels of the memory cells are initialized. In this way, the channel initialization may be performed by applying predetermined voltages to the word lines WL, the drain select line DSL, and the source select line SSL for predetermined time frames. In some embodiments of the disclosed technology, the channel initialization may not be performed beyond the set channel initialization time (CIT), and the channel initialization time (CIT) is terminated when 0 V is applied to the source select line SSL.

When the channel initialization is terminated, 0 V may be applied to the source select line SSL. When 0 V is applied to the source select line SSL, the source select transistor SST may be turned off. Practically speaking, the bit line precharge is performed from a time point at which the source select transistor SST is turned off.

An increase in the channel initialization time can lead to an increase in the bit line precharge period. Therefore, the channel initialization can negatively impact on a read time tR during which a read operation is performed. In this regard, some embodiments of the disclosed technology can reduce unnecessary time consumption on the channel initialization, which impacts on the read time tR by setting different channel initialization times CIT for respective read operations.

Figure 9:
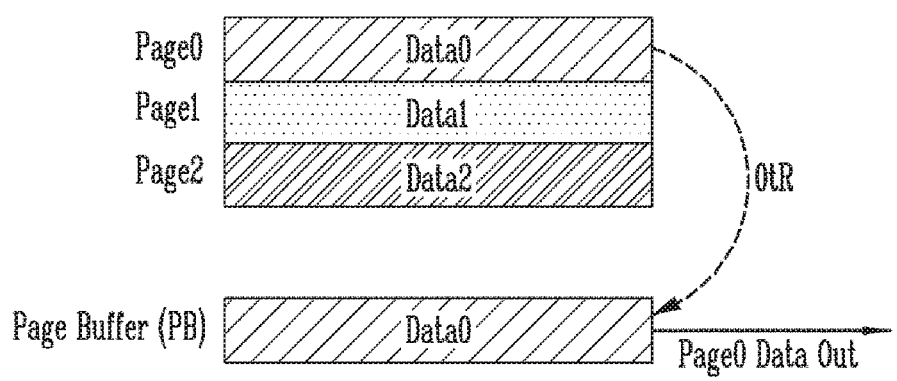
FIG. 9 is a diagram illustrating an example method of reading pages.

FIG. 9 is a diagram illustrating an example method of reading pages.

Specifically, some pages Page0 to Page2 of pages included in any one memory block, among a plurality of memory blocks BLK1 to BLKz included in a memory device 100, and a page buffer PB are illustrated. Each of the memory blocks BLK1 to BLKz may include a larger number of pages. Each page may include a plurality of memory cells. At a point in time during a read operation, the channels of a plurality of memory cells included in each page may be initialized.

In a scenario where 0-th data Data0 is stored in a 0-th page Page0, first data Data1 is stored in a first page Page1, and second data Data2 is stored in a second page Page2, data stored in each page may be read during a read operation as follows.

The memory device 100 may receive an entire page read command from a memory controller 200 to perform a read operation. Here, the entire page may indicate a selected page. In an example implementation where memory cells in a page are grouped into a first half page and a second half page, the entire page may include both the first and second half pages included in the selected page. When the read operation is performed on the entire page, all data stored in a selected page may be read if any one of the 0-th to second pages Page0 to Page2 is selected.

In order to read the data stored in the selected page, the data stored in the selected page may be stored in the page buffer PB. The read time tR may indicate the time taken to store the data read from the selected page into the page buffer PB. The read time tR may include a channel initialization time (CIT).

When the 0-th page Page0 is selected, the 0-th data Data0 stored in the 0-th page may be read into the page buffer PB. The time taken to read the 0-th data Data0 from the 0-th page Page0 and store into the page buffer PB may be a 0-th read time 0tR. After the 0-th read time 0tR has elapsed, the data stored in the page buffer PB may be output to the memory controller (Page0 Data Out). The memory device 100 may perform a next read operation after outputting the 0-th data Data0 to the memory controller 200.

Figure 10:
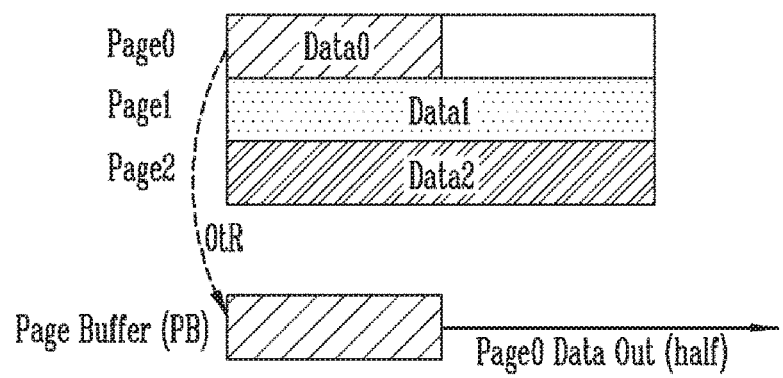
FIG. 10 is a diagram illustrating an example method of reading a half page.

FIG. 10 is a diagram illustrating an example method of reading a half page.

Specifically, some pages Page0 to Page2 of pages included in any one memory block, among a plurality of memory blocks BLK1 to BLKz included in a memory device 100, and a page buffer PB are illustrated. Each of the memory blocks BLK1 to BLKz may include a larger number of pages than illustrated by example. Each page may include a plurality of memory cells. At a point in time during a read operation (e.g., at the beginning of the read operation), the channels of a plurality of memory cells included in each page may be initialized.

In a scenario where 0-th data Data0 is stored in a half page of the 0-th page Page0, first data Data1 is stored in the first page Page1, second data Data2 is stored in the second page Page2, when a read operation is performed on each page, all or part of data stored in each page may be read. When the size of a page buffer PB is smaller than that of the data stored in each page, part of the data stored in the corresponding page may be read into the page buffer PB. Therefore, in order to read the data stored in each page, at least two read operations are needed.

Each page may include a first half page and a second half page. The first half page may include first memory cells among the memory cells included in the corresponding page, and the second half page may include second memory cells among the memory cells included in the corresponding page. The second memory cells may be arranged to alternate with the first memory cells. In this case, the first memory cells may be coupled to even-numbered bit lines, respectively, and the second memory cells may be coupled to odd bit lines, respectively. In an embodiment, the first memory cells and the second memory cells may be sequentially arranged.

The memory device 100 may read part of the data stored in each page in response to a half page read command. The memory device 100 may read a first half page and a second half page included in a selected page on a half-page by half-page basis. For example, upon completion of a read operation on the first half page, the memory device 100 may perform a read operation on the second half page. In this way, the memory device 100 may read the entire data stored in the entire page including the first half page and the second half page.

In order to read out data stored in the selected page, the data may first be read into the page buffer PB from the selected page. When the read operation corresponding to the half page read command is performed, part of the data stored in the selected page may be stored in the page buffer PB. Here, a read time tR may indicate the time taken to read data from the selected page and store the data in the page buffer PB. The read time tR may include a channel initialization time (CIT).

Such a partial page read takes less time than an entire page read since the data size to be read is less than that of the entire page read, and thus the read time tR may be shortened. When the read time tR is shortened, the channel initialization time (CIT) for performing the read operation may also be shortened. Therefore, the channel initialization time (CIT) required when the read operation corresponding to the half page read command is performed may be shorter than that required when the read operation corresponding to the entire page read command is performed.

In some embodiments of the disclosed technology, upon selection of the 0-th page Page0, part (e.g., first half) of the 0-th data Data0 stored in the 0-th page may first be read into the page buffer PB. Here, the time taken to store the part of the 0-th data Data0 in the page buffer PB may be 0-th read time 0tR. After the 0-th read time 0tR has elapsed, the data stored in the page buffer PB may be output to the memory controller (Page0 Data Out (half)). The memory device 100 may perform a next read operation to read the remaining part (e.g., second half) of the 0-th data Data0 after outputting the first part (e.g., first half) of the 0-th data Data0 to the memory controller 200.

Figure 11:
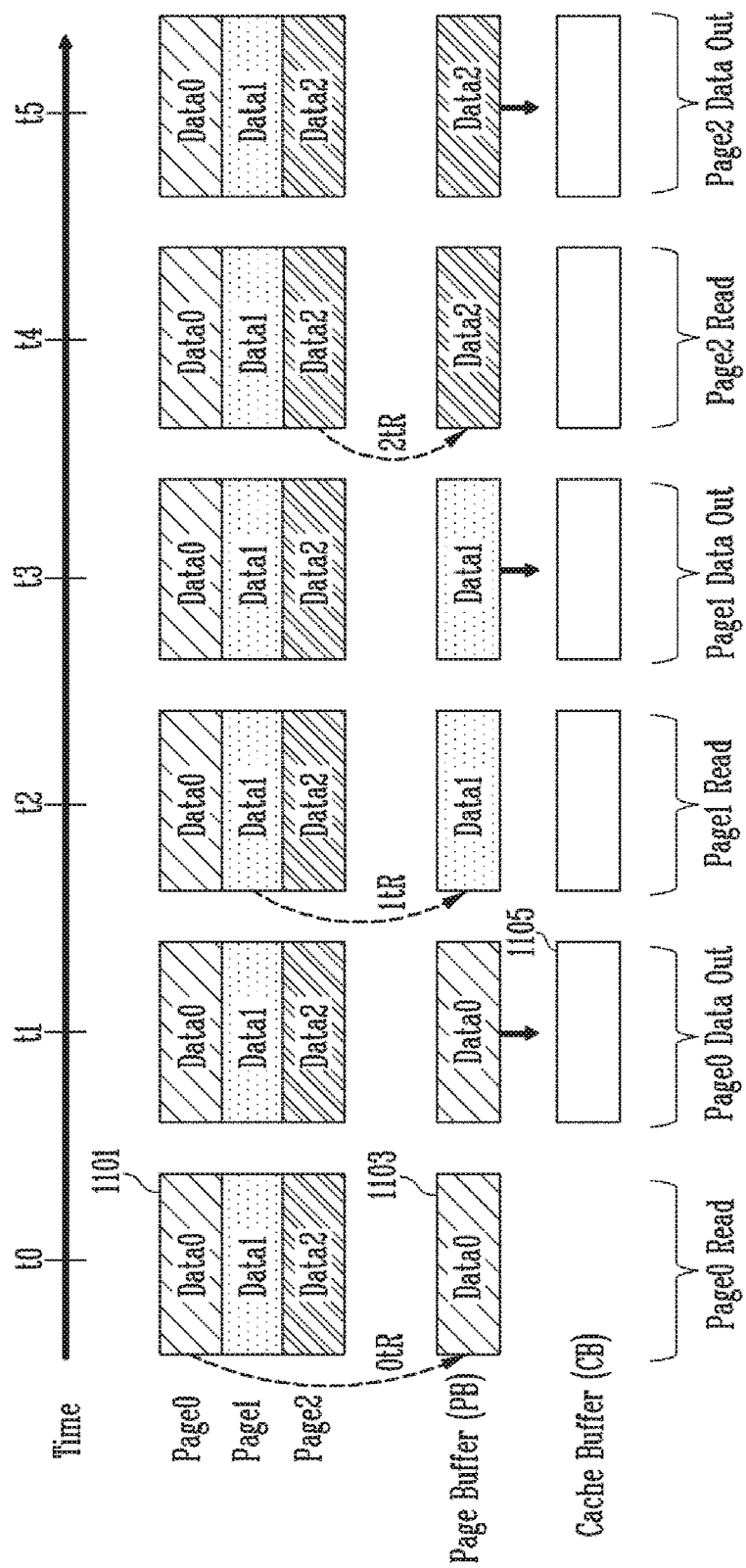
FIG. 11 is a diagram illustrating in detail the example method illustrated in FIG. 9.

FIG. 11 is a diagram illustrating in detail the example method illustrated in FIG. 9.

Specifically, some pages Page0 to Page2 1101 of pages included in any one memory block, among a plurality of memory blocks BLK1 to BLKz included in a memory device 100, a page buffer PB 1103, and a cache buffer CB 1105 are illustrated. Each of the memory blocks BLK1 to BLKz may include a larger number of pages than illustrated by example. The memory device 100 may read data Data0 to Data2 stored in the 0-th to second pages Page0 to Page2 through time periods t0 to t5.

In an implementation of the disclosed technology, the memory device 100 may read data stored in a single page through a single read operation. Therefore, in order to read the data Data0 to Data2 stored in the 0-th to second pages Page0 to Page2, three read operations 0tR to 2tR are performed.

During a normal read operation, even if the memory device 100 includes the cache buffer CB, the data stored in the page buffer PB may not be stored in the cache buffer CB. Therefore, data Data0 to Data2 stored in the 0-th to second pages Page0 to Page2 stored in the page buffer PB may be directly output to the memory controller 200. The operations of storing the data Data0 to Data2 in the page buffer PB and the operations of outputting the data from the page buffer PB to the memory controller 200 may be performed in the following time sequence.

At time t0, the memory device 100 may store 0-th data Data0 stored in the 0-th page Page0 in the page buffer PB (Page0 Read).

At time t1, the memory device 100 may output the 0-th data Data0 from the page buffer PB to the memory controller 200 (Page0 Data Out).

At time t2, the memory device 100 may store first data Data1 stored in the first page Page1 in the page buffer PB (Page1 Read).

At time t3, the memory device 100 may output the first data Data1 from the page buffer PB to the memory controller 200 (Page1 Data Out).

At time t4, the memory device 100 may store second data Data2 stored in the second page Page2 in the page buffer PB (Page2 Read).

At time t5, the memory device 100 may output the second data Data2 from the page buffer PB to the memory controller 200 (Page2 Data Out).

In the above-described read operation, the operation of reading and transferring data from memory cells to the page buffer PB and the operation of outputting data from the page buffer PB to the memory controller 200 may be performed as separate operations.

Figure 12:
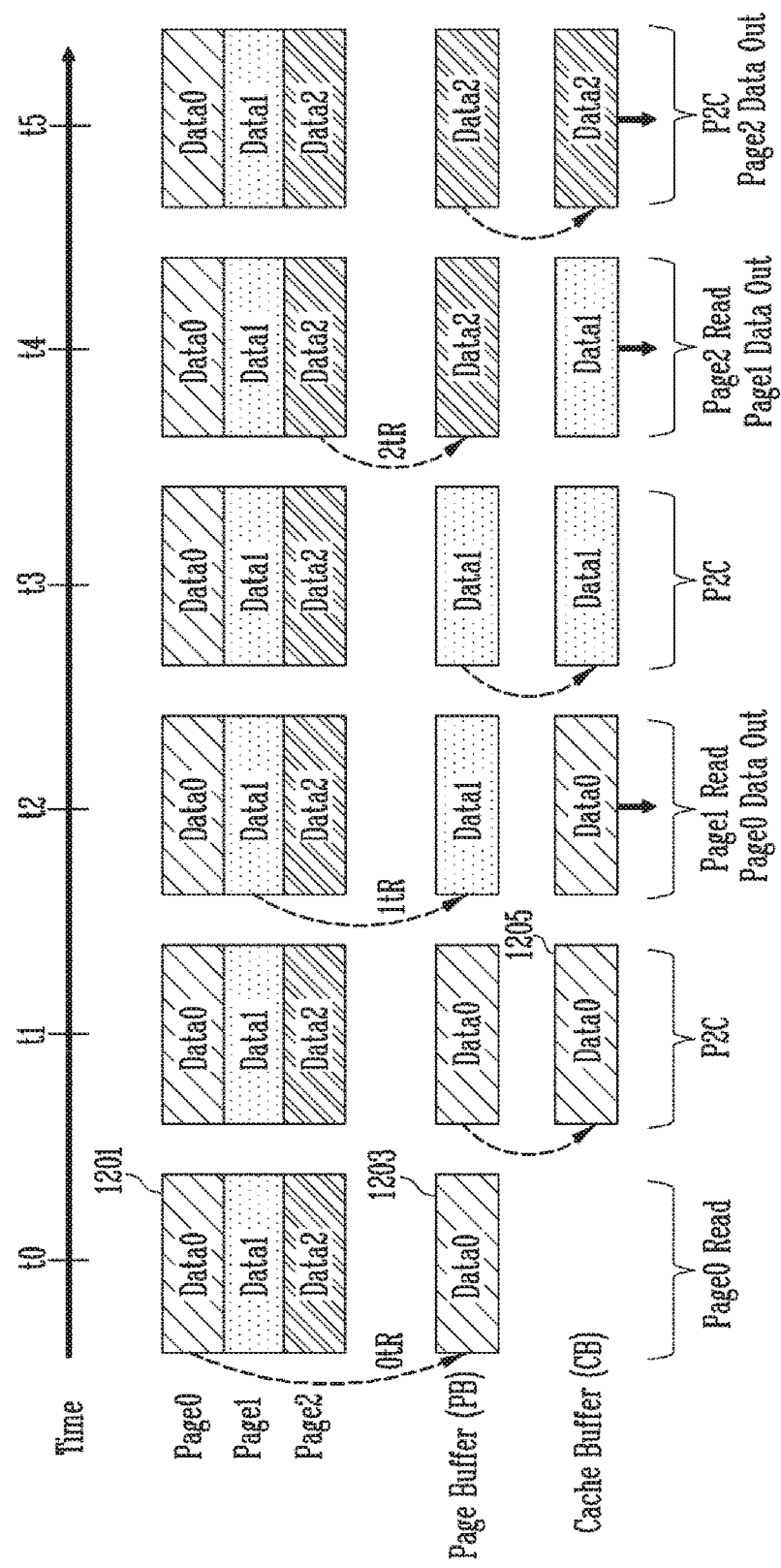
FIG. 12 is a diagram illustrating a cache read operation.

FIG. 12 is a diagram illustrating a cache read operation.

Specifically, some pages Page0 to Page2 1201 of pages included in any one memory block, among a plurality of memory blocks BLK1 to BLKz included in the memory device 100, a page buffer PB 1203, and a cache buffer CB 1205 are illustrated. Each of the memory blocks BLK1 to BLKz may include a larger number of pages than illustrated by example. The memory device 100 may read data Data0 to Data2 stored in the 0-th to second pages Page0 to Page2 using a cache read method in the illustrated sequence. The data Data0 to Data2 stored in the 0-th to second pages Page0 to Page2 may be read out through time periods t0 to t5.

In an implementation of the disclosed technology, the memory device 100 may read data stored in a single page through a single read operation. Therefore, in order to read the data Data0 to Data2 stored in the 0-th to second pages Page0 to Page2, three read operations 0tR to 2tR are performed.

During a cache read operation, the data Data0 to Data2 respectively stored in the 0-th to second pages Page0 to Page2 may be transferred from corresponding memory cells to the page buffer PB. The data stored in the page buffer PB may be stored in the cache buffer CB. The data stored in the cache buffer CB may be output to the memory controller 200. During the cache read operation, the memory device 100 may use both the page buffer PB and the cache buffer CB in reading out data from the memory cells. During the cache read operation, the page buffer PB and the cache buffer CB may be independently operated. Therefore, the data stored in the cache buffer CB may be output to the memory controller 200 while the data Data0 to Data2, stored in respective pages are being transferred to the page buffer PB. The cache read operation may be performed in the following time sequence.

At time t0, the memory device 100 may store 0-th data Data0 stored in the 0-th page Page0 in the page buffer PB (Page0 Read).

At time t1, the memory device 100 may copy the 0-th data Data0 stored in the page buffer PB to the cache buffer CB (P2C).

At time t2, the memory device 100 may output the 0-th data Data0, which is stored in the cache buffer CB, to the memory controller 200 (Page0 Data Out) while first data Data1 stored in the first page Page1 is being transferred to the page buffer PB (Page1 Read).

At time t3, the memory device 100 may copy the first data Data1, which is stored in the page buffer PB, to the cache buffer CB (P2C).

At time t4, the memory device 100 may output the first data Data1, which is stored in the cache buffer CB, to the memory controller 200 (Page1 Data Out) while second data Data2 stored in the second page Page2 is being transferred to the page buffer PB (Page2 Read).

At time t5, the memory device 100 may copy the second data Data2, which is stored in the page buffer PB, to the cache buffer CB (P2C), and thereafter output the second data Data2 from the cache buffer CB to the memory controller 200 (Page2 Data Out).

At times t2, t4 and t5 in the above-described cache read operations, the operation of outputting the data stored in the cache buffer CB may be performed while the operation of reading and transferring the data stored in respective pages to the page buffer PB is being performed. Therefore, the sequential read operation performed using the cache read operation allows the memory device 100 to perform the read operations more rapidly and effectively compared to a normal read operation performed without using the cache read operation.

However, the cache read operation has a drawback in that a channel initialization time (CIT) of the cache read operation may become longer than that of a typical normal read operation because data stored in respective pages should be successively read out during the cache read operation and each read operation requires the channel initialization time (CIT).

Figures 13, 14:
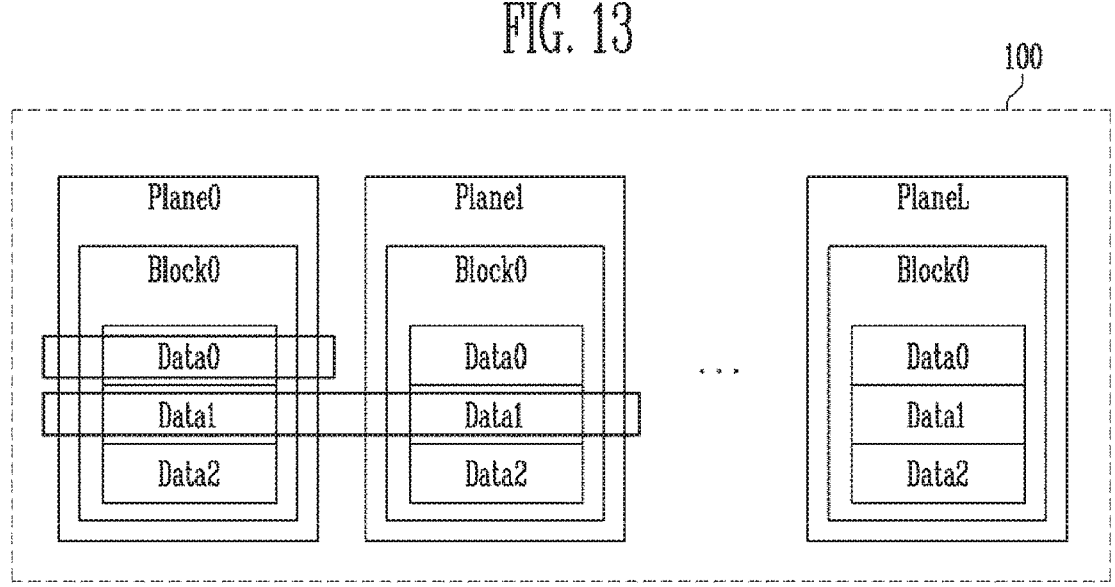
FIG. 13 is a diagram illustrating an example method of reading a page included in a single plane and an example method of reading pages included in multiple planes.
FIG. 14 is a diagram illustrating an example of an offset table including offsets set to initialize the channels of memory cells.

FIG. 13 is a diagram illustrating an example method of reading a page included in a single plane and an example method of reading pages included in multiple planes.

Specifically, multiple planes Plane0 to PlaneL included in a memory device 100, a 0-th memory block Block0 among a plurality of memory blocks included in each of the multiple planes Plane® to PlaneL, and 0-th to second pages Page0 to Page2 among pages included in the 0-th memory block Block0 are illustrated. Each of the multiple planes Plane® to PlaneL may include a plurality of memory blocks. Each of the memory blocks may include a plurality of pages.

In an embodiment, a read operation may be performed on a page included in any one of the multiple planes Plane® to PlaneL. A read operation performed on any one of the multiple planes Plane0 to PlaneL may be a single plane read operation. The single plane read operation may be performed in response to a single plane read command provided from a memory controller 200.

For example, a read operation may be performed on the 0-th page Page0 of the 0-th memory block Block0 included in the 0-th plane Plane0. Since the read operation on the 0-th page Page0 is a read operation performed on the 0-th plane Plane0 among the multiple planes Plane0 to PlaneL, it may be a single plane read operation. The single plane read operation may include an entire page read operation of reading the entire data stored in a selected page. The single plane read operation may include a half page read operation of reading part (e.g., half) of the data stored in the selected page. The single plane read operation may include a cache read operation.

During a single plane read operation, channel initialization may be performed by initializing the channels of the memory cells included in the selected page on which the read operation is performed. When the single plane read operation includes a cache read operation, the channel initialization time (CIT) may be lengthened. When the single plane read operation includes a half page read operation, the channel initialization time (CIT) may be shortened. Therefore, when a single plane read operation corresponding to a single plane read command is performed, the channel initialization time (CIT) may be the longest in the cache read operation, and may be the shortest in the half page read operation.

In an embodiment, a read operation may be performed on pages included in two or more of the multiple planes Plane® to PlaneL. The read operation performed on two or more of the multiple planes Plane® to PlaneL may be a multi-plane read operation. The multi-plane read operation may be performed in response to a multi-plane read command provided from the memory controller 200.

For example, a read operation may be performed on the first pages Page1 of the 0-th memory blocks Block0 respectively included in the 0-th plane Plane0 and the first plane Plane1. The 0-th memory blocks Block0 respectively included in the 0-th plane Plane0 and the first plane Plane1 may constitute a single superblock. The pages included in the superblock may constitute a super page.

Since the read operation performed on the first pages Page1 of the 0-th memory blocks Block0 respectively included in the 0-th plane Plane0 and the first plane Plane1 is simultaneously performed on multiple planes (e.g., the 0-th plane Plane0 and the first plane Plane1), the read operation in this scenario is a multi-plane read operation. The multi-plane read operation may include an entire page read operation of reading the entire data stored in selected pages. The multi-plane read operation may also include a half page read operation of reading part (e.g., half) of the entire data stored in the selected pages. In an implementation, when the multi-plane read operation includes the half page read operation, a read data obtained by the multi-plane read operation may be part of data stored in pages included in each plane. The multi-plane read operation may include a cache read operation.

During the multi-plane read operation, channel initialization may be performed by initializing the channels of the memory cells included in the selected pages on which the read operation is performed. When the multi-plane read operation includes a cache read operation, channel initialization time (CIT) may be lengthened. When the multi-plane read operation includes a half page read operation, the channel initialization time (CIT) may be shortened. Therefore, when a multi-plane read operation corresponding to a multi-plane read command is performed, the channel initialization time (CIT) may be the longest in the cache read operation, and may be the shortest in the half page read operation.

FIG. 14 is a diagram illustrating an example of an offset table including offsets set to initialize the channels of memory cells.

Referring to FIG. 14, an offset setting unit 223 may use an offset table to select the most appropriate offset for the types of read command. In an implementation, the offset setting unit 233 retains the offset table. In another implementation, a separate memory is used to store the offset table. The offset table may include different offsets for different read commands, and the offset can vary depending on whether a read operation is performed in a single plane or in multiple planes. Further, the offset table may include different offsets for different temperature ranges within a read operation of the memory device 100 is performed.

Channel initialization time information CIT_INF may be generated based on the offsets. The channel initialization time information CIT_INF may be information about a time obtained based on a preset default time and an offset received from the offset setting unit 223. The preset default time may be the longest channel initialization time (CIT), among channel initialization times depending on read commands. Each offset may be a value that is added to or subtracted from a preset default time. For example, the channel initialization time information CIT_INF may be used to adjust the longest channel initialization time (CIT) by the offset. By subtracting the offset from (or by adding the offset to) the preset default time, the optimal channel initialization time (CIT) may be obtained.

In an embodiment, the memory device 100 may perform a read operation in multiple planes or in a single plane. The multi-plane read operation or the single plane read operation may include an entire page read operation of reading all of data stored in selected pages. The multi-plane read operation or the single plane read operation may include a half page read operation of reading part (e.g., half) of data stored in the selected pages. When the multi-plane read operation includes the half page read operation, this half page read operation may be treated as a single plane read operation. The multi-plane read operation or the single plane read operation may include a cache read operation.

In an embodiment of the disclosed technology, the memory device 100 may retain an offset table therein or somewhere else outside the memory device 100. For example, the memory device 100 may include an offset setting unit to retain an offset table. Here, the offset table can be a lookup table that includes different offsets corresponding different conditions including temperature, whether the target read operation is a multi-plane read operation or a single plane read operation, and types of read command. The offset table may include offset values Offset11 to Offset16 corresponding to a temperature range of p1 to p2° C. within which the read operation is performed. Each offset Offset11, . . . , or Offset16 belonging to the temperature range of p1 to p2° C. may be set depending on whether the read operation is performed in multiple planes or in a single plane. For example, offsets required when the read operation is performed in multiple planes may be set to values greater than those required when the read operation is performed in a single plane.

In a case where the read operation is performed in multiple planes, when the read operation is a cache read operation, the offset Offset11 is used to adjust a preset default time. The offset Offset11, which is used to adjust the preset default time in the cache read operation, may be set to a value greater than that of the offset Offset12 or Offset13, which is used to adjust the preset default time in the page read or half page read operation, respectively. That is, the offset Offset11 in the cache read operation may be set to the largest value.

In a case where the read operation is performed in multiple planes, when the read operation is a page read operation (normal page read operation), the offset Offset12 is used to adjust a preset default time. The offset Offset12, which is used to adjust the preset default time in the page read operation (normal page read operation), may be less than the offset Offset11, which is used to adjust the preset default time in the cache read operation, and may be greater than the offset Offset13, which is used to adjust the preset default time in the half page read operation.

In a case where the read operation is performed in multiple planes, when the read operation is a half page read operation, the offset Offset13 is used to adjust a preset default time. The offset Offset13, which is used to adjust the preset default time in the half page read operation, may be set to a value less than the offset Offset11 or Offset12, which is used to adjust the preset default time in the cache read or page read (normal page read) operation, respectively. That is, the offset Offset13 in the half page read operation may be set to the smallest value.

In a case where the read operation is performed in a single plane, when the read operation is a cache read operation, the offset Offset14 is used to adjust a preset default time. The offset Offset14, which is used to adjust the preset default time in the cache read operation, may be set to a value greater than that of the offset Offset15 or Offset16, which is used to adjust the preset default time in a page read or half page read operation, respectively. That is, the offset Offset14 in the cache read operation may be set to the largest value.

In a case where the read operation is performed in the single plane, when the read operation is a page read operation (normal page read operation), the offset Offset15 is used to adjust a preset default time. The offset Offset15, which is used to adjust the preset default time in the page read operation (normal page read operation), may be less than the offset Offset14, which is used to adjust the preset default time in the cache read operation, and may be greater than the offset Offset16, which is used to adjust the preset default time in the half page read operation.

In a case where the read operation is performed in the single plane, when the read operation is a half page read operation, the offset Offset16 is used to adjust a preset default time. The offset Offset16, which is used to adjust the preset default time in the half page read operation, may be set to a value less than the offset Offset14 or Offset15, which is used to adjust the preset default time in the cache read or page read (normal page read) operation, respectively. That is, the offset Offset16 in the half page read operation may be set to the smallest value.

In an embodiment, an offset required when the read operation is performed in multiple planes may be set to a value greater than that required when the read operation is performed in a single plane. The size of data read out from a larger number of pages in multiple planes will be larger than the size of data read out from a single plane, and thus larger offsets will be needed for the multiple plane case.

For example, in the cache read operation, the offset Offset11 corresponding to a cache read in a multi-plane case may be a value greater than that of the offset Offset14 corresponding to a cache read in a single plane case. In the page read operation (normal page read operation) of the multi-plane case, the offset Offset12 may be a value greater than that of the offset Offset15 corresponding to the page read operation of the single plane case. In the half page read operation, the offset Offset13 may be a value greater than that of the offset Offset16 corresponding to the half page read operation of the single plane case.

The offset table may also include offset values Offset21 to Offset26 corresponding to a temperature range of p2 to p3° C. within which the read operation is performed. Each offset Offset21, . . . , or Offset26 belonging to the temperature range of p2 to p3° C. may be set depending on whether the read operation is performed in multiple planes or in a single plane. For example, offsets required when the read operation is performed in multiple planes may be set to values greater than those required when the read operation is performed in a single plane.

In a case where the read operation is performed in multiple planes, when the read operation is a cache read operation, the offset Offset21 is used to adjust the preset default time. The offset Offset21, which is used to adjust the preset default time in the cache read operation, may be set to a value greater than that of the offset Offset22 or Offset23, which is used to adjust the preset default time in the page read or half page read operation, respectively. That is, the offset Offset21 in the cache read operation may be set to the largest value.

In a case where the read operation is performed in multiple planes, when the read operation is a page read operation (normal page read operation), the offset Offset22 is used to adjust a preset default time. The offset Offset22, which is used to adjust the preset default time in the page read operation (normal page read operation), may be less than the offset Offset21, which is used to adjust the preset default time in the cache read operation, and may be greater than the offset Offset23, which is used to adjust the preset default time in the half page read operation.

In a case where the read operation is performed in multiple planes, when the read operation is a half page read operation, the offset Offset23 is used to adjust preset default time. The offset Offset23, which is used to adjust the preset default time in the half page read operation, may be set to a value less than the offset Offset21 or Offset22, which is used to adjust the preset default time in the cache read or page read (normal page read) operation, respectively. That is, the offset Offset23 in the half page read operation may be set to the smallest value.

In a case where the read operation is performed in a single plane, when the read operation is a cache read operation, the offset Offset24 is used to adjust a preset default time. The offset Offset24, which is used to adjust the preset default time in the cache read operation, may be set to a value greater than that of the offset Offset25 or Offset26, which is used to adjust the preset default time in a page read or half page read operation, respectively. That is, the offset Offset24 in the cache read operation may be set to the largest value.

In a case where the read operation is performed in the single plane, when the read operation is a page read operation (normal page read operation), the offset Offset25 is used to adjust a preset default time. The offset Offset25, which is used to adjust the preset default time in the page read operation (normal page read operation), may be less than the offset Offset24, which is used to adjust the preset default time in the cache read operation, and may be greater than the offset Offset26, which is used to adjust the preset default time in the half page read operation.

In a case where the read operation is performed in the single plane, when the read operation is a half page read operation, the offset Offset26 is used to adjust a preset default time. The offset Offset26, which is used to adjust the preset default time in the half page read operation, may be set to a value less than the offset Offset24 or Offset25, which is used to adjust the preset default time in the cache read or page read (normal page read) operation, respectively. That is, the offset Offset26 in the half page read operation may be set to the smallest value.

In an embodiment, an offset required when the read operation is performed in multiple planes may be set to a value greater than that required when the read operation is performed in a single plane. The size of data read out from a larger number of pages in multiple planes will be larger than the size of data read out from a single plane, and thus larger offsets will be needed for the multiple plane case.

For example, in the cache read operation, the offset Offset21 corresponding to a cache read in a multi-plane case may be a value greater than that of the offset Offset24 corresponding to a cache read in a single plane case. In the page read operation (normal page read operation) of the multi-plane case, the offset Offset22 may be a value greater than that of the offset Offset25 corresponding to the page read operation of the single plane case. In the half page read operation, the offset Offset23 may be a value greater than that of the offset Offset26 corresponding to the half page read operation of the single plane case.

Once the offsets are set, the channel initialization time information CIT_INF may be generated. The channel initialization time information CIT_INF may be generated based on the preset default time and the offset received from the offset setting unit 223. During a read operation, the channel initialization time information CIT_INF may include information about optimal channel initialization time (CIT). The memory controller 200 may provide the channel initialization time information CIT_INF to the memory device 100. A set value for the channel initialization time preset in the memory device 100 may be updated based on the channel initialization time information CIT_INF.

Figure 15:
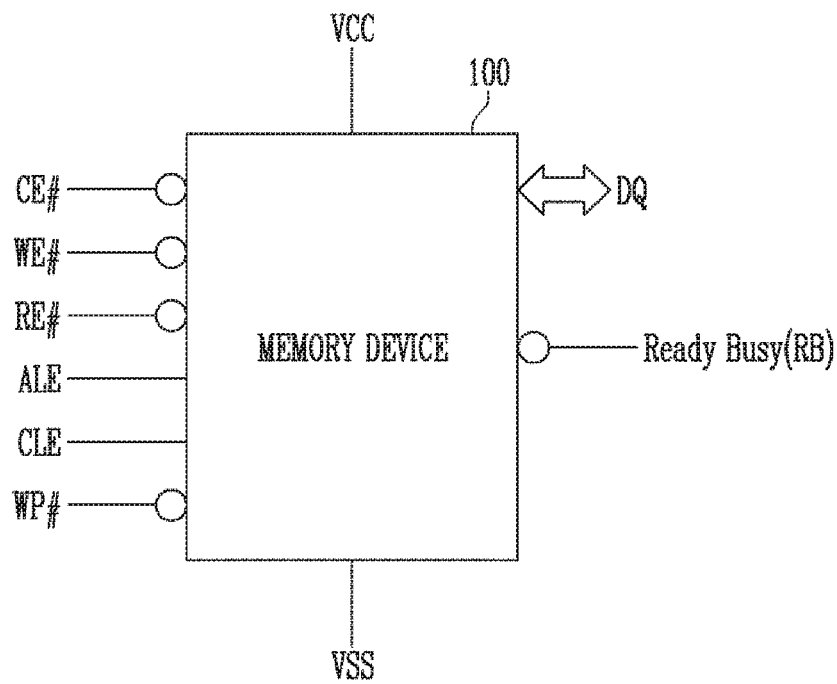
FIG. 15 is a diagram illustrating an example of a pin configuration of the memory device of FIG. 1.

FIG. 15 is a diagram illustrating an example of the pin structure of the memory device of FIG. 1.

Referring to FIG. 15, the memory device 100 may communicate with an external controller through a plurality of input/output lines. For example, the memory device 100 may communicate with the external controller through control signal lines which include a chip enable line CE #, a write enable line WE #, a read enable line RE #, an address latch enable line ALE, a command latch enable line CLE, a write protect line WP #, and a ready/busy line RB, and data input/output lines DQ.

The memory device 100 may receive a chip enable signal from the external controller through the chip enable line CE #. The memory device 100 may receive a write enable signal from the external controller through the write enable line WE #. The memory device 100 may receive a read enable signal from the external controller through the read enable line RE #. The memory device 100 may receive an address latch enable signal from the external controller through the address latch enable line ALE. The memory device 100 may receive a command latch enable signal from the external controller through the command latch enable line CLE. The memory device 100 may receive a write protect signal from the external controller through the write protect line WP #.

In an embodiment, the memory device 100 may provide a ready/busy signal, indicating whether the memory device 100 is in a ready state or in a busy state, to the external controller through the ready/busy line RB.

The chip enable signal may be a control signal for selecting the memory device 100. When the chip enable signal is in a 'high' state and the memory device 100 is in a 'ready' state, the memory device 100 may enter a low-power standby state.

The write enable signal may be a control signal for performing control so that commands, addresses, and input data which are applied to the memory device are stored in a latch.

The read enable signal may be a control signal for enabling the output of serial data.

The address latch enable signal may be one of control signals used by the host so as to indicate which one of a command, an address, and data corresponds to the type of signal input to the input/output lines DQ.

The command latch enable signal may be one of control signals used by the host so as to indicate which one of a command, an address, and data corresponds to the type of signal input to the input/output lines DQ.

For example, when the command latch enable signal is activated (e.g., to a logic high state), the address latch enable signal is deactivated (e.g., to a logic low state), and the write enable signal is activated (e.g., to a logic low state) and then deactivated (e.g., to a logic high state), the memory device 100 may identify that the signal input through the input/output lines DQ is a command.

For example, when the command latch enable signal is deactivated (e.g., to a logic low state), the address latch enable signal is activated (e.g., to a logic high state), and the write enable signal is activated (e.g., to a logic low state) and then deactivated (e.g., to a logic high state), the memory device 100 may identify that the signal input through the input/output lines DQ is an address.

The write protect signal may be a control signal for deactivating the program operation and the erase operation that are performed by the memory device 100.

The ready/busy signal may be a signal for identifying the status of the memory device 100. That is, the ready/busy signal in a low state indicates that the memory device 100 is performing at least one operation. The ready/busy signal in a high state indicates that the memory device 100 is performing no operation.

The ready/busy signal may be in a low state while the memory device 100 is performing any one of a program operation, a read operation, and an erase operation. In an embodiment of the disclosed technology, the memory controller 200, described with reference to FIG. 2, may decide on a termination time which is the time at which the program operation or the erase operation is terminated based on the ready/busy signal.

Figure 16:
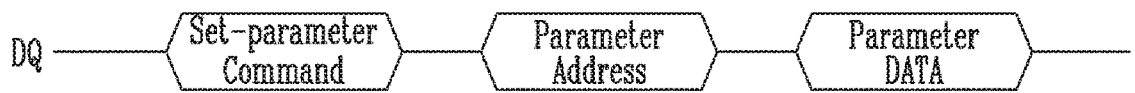
FIG. 16 is a diagram illustrating how a memory controller sets or updates the channel initialization time for memory cells.

FIG. 16 is a diagram illustrating how the memory controller can set or update the channel initialization time for memory cells.

Referring to FIG. 16, the memory controller 200 may change a channel initialization time (CIT) using a set-parameter command.

The memory controller 200 may provide a set-parameter command, a parameter address, and parameter data to the memory device 100 through input/output lines DQ. The memory controller 200 may generate channel initialization time information CIT_INF, and may provide the generated channel initialization time information CIT_INF, as parameter data, to the memory device 100.

The set-parameter command may be a command for setting data stored in a specific register, among a plurality of registers included in the memory device 100, such that the data can include the channel initialization time (CIT).

When the channel initialization time (CIT) is set, the data associated with the channel initialization time (CIT) is fetched based on a parameter address. Here, the parameter address may be the address of the register which stores data about the channel initialization time (CIT).

The memory device 100 may decide on the channel initialization time (CIT) for performing a read operation based on the parameter data. The parameter data may include the channel initialization time information CIT_INF. The parameter data may include values related to channel initialization.

Figure 17:
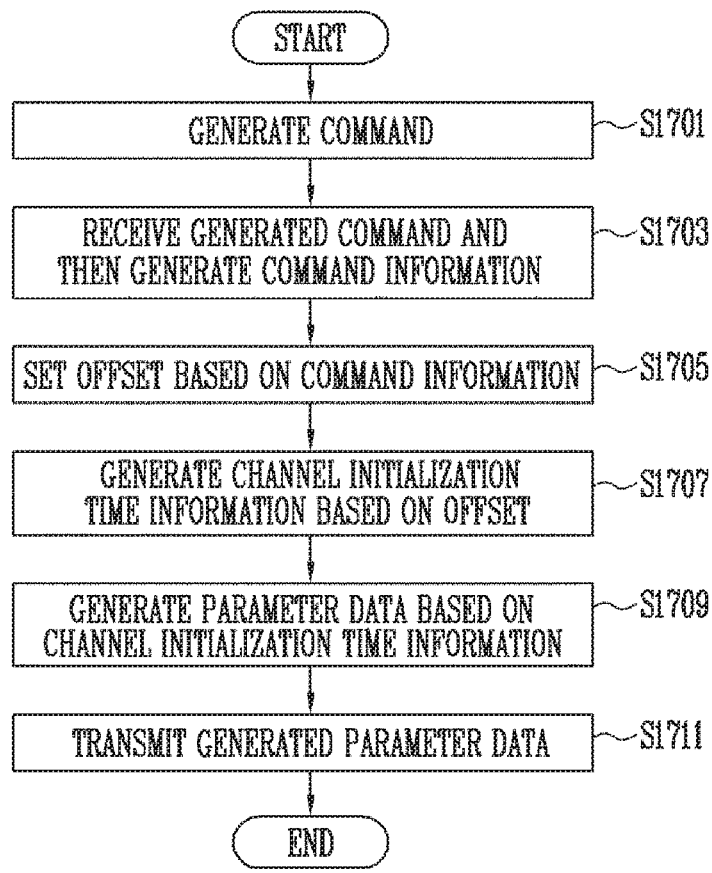
FIG. 17 is a flowchart illustrating the operation of a memory controller based on an embodiment of the disclosed technology.

FIG. 17 is a flowchart illustrating the operation of the memory controller based on an embodiment of the disclosed technology.

Referring to FIG. 17, at step S1701, a command generation unit 210 may generate a command for a read operation to be performed by a memory device 100 in response to a request from a host 300. The generated command may be a command for the read operation. The command for the read operation may be a read command.

At step S1703, a command analysis unit 221 may receive the command generated by the command generation unit 210, and may generate command information CMD_INF indicating the type of read command for a selected page. The command information CMD_INF may include information corresponding to at least one of multi-plane read command information, single plane read command information, cache read command information, normal read command information, entire page read command information, and half page read command information.

At step S1705, an offset setting unit 223 may set an offset based on the command information CMD_INF. The offset setting unit 223 may set the offset for deciding on a channel initialization time (CIT) using the command information CMD_INF provided from the command analysis unit 221. The offset setting unit 223 may store an offset table including different offsets corresponding to the types of read command.

At step S1707, channel initialization time information CIT_INF for a plurality of memory cells included in a selected page may be generated based on the set offset. The channel initialization time information CIT_INF may be information about a time obtained based on a preset default time and the offset received from the offset setting unit 223. In an implementation, the channel initialization time information CIT_INF may be information about a time obtained by summing a preset default time and the offset received from the offset setting unit 223. In an implementation, the offset can indicate a time value to be subtracted from or to be added to the preset default time. For example, in cases where the preset default time is the maximum possible channel initialization time, the channel initialization time information CIT_INF may be used to subtract the offset from the preset default time. In cases where the preset default time is the minimum possible channel initialization time, the channel initialization time information CIT_INF may be used to add the offset to the preset default time. The channel initialization time information CIT_INF may be information about an optimal channel initialization time (CIT) for each read command.

At step S1709, parameter data may be generated based on the channel initialization time information CIT_INF. The channel initialization time information CIT_INF may be generated as the parameter data.

At step S1711, the generated parameter data may be transmitted to the memory device 100. When the parameter data is transmitted to the memory device 100, it may be used to set the time during which the channels of memory cells are initialized when the memory device 100 performs a read operation.

Figure 18:
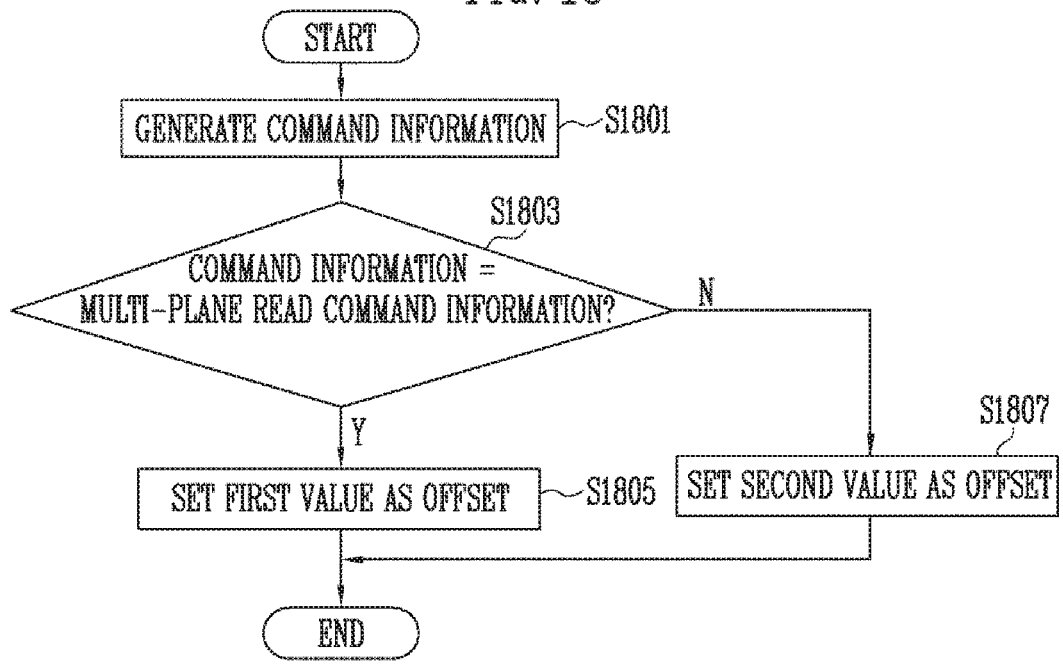
FIG. 18 is a flowchart illustrating the operation of the memory controller based on an embodiment of the disclosed technology.

FIG. 18 is a flowchart illustrating the operation of the memory controller based on an embodiment of the disclosed technology.

Referring to FIG. 18, at step S1801, a command analysis unit 221 may receive a command generated by a command generation unit 210, and may generate command information CMD_INF indicating the type of read command for a selected page. The command information CMD_INF may include information corresponding to at least two of multi-plane read command information, single plane read command information, cache read command information, normal read command information, entire page read command information, and half page read command information.

At step S1803, whether the command information CMD_INF is multi-plane read command information may be determined. The multi-plane read command information may be command information about a read operation performed on two or more of multiple planes.

When the command information CMD_INF is the multi-plane read command information, the process proceeds to step S1805. When the command information CMD_INF is not multi-plane read command information, the process proceeds to step S1807. When the command information CMD_INF is not multi-plane read command information, the command information CMD_INF may be single plane read command information.

At step S1805, an offset setting unit 223 may set a first value as an offset. The first value may vary depending on which type of information, among entire page read command information for reading all data stored in selected pages, half page read command information for reading part of the data stored in the selected pages, and cache read command information, is included in the multi-plane read command information. In detail, when the multi-plane read command information includes cache read command information, the largest value may be set as the first value. When the multi-plane read command information includes half page read command information, the smallest value may be set as the first value.

At step S1807, the offset setting unit 223 may set a second value as the offset. The second value may vary depending on which type of information, among entire page read command information for reading all data stored in selected pages, half page read command information for reading part of the data stored in the selected pages, and cache read command information, is included in the single plane read command information. In detail, when the single plane read command information includes cache read command information, the largest value may be set as the second value. When the single plane read command information includes half page read command information, the smallest value may be set as the second value.

Figure 19:
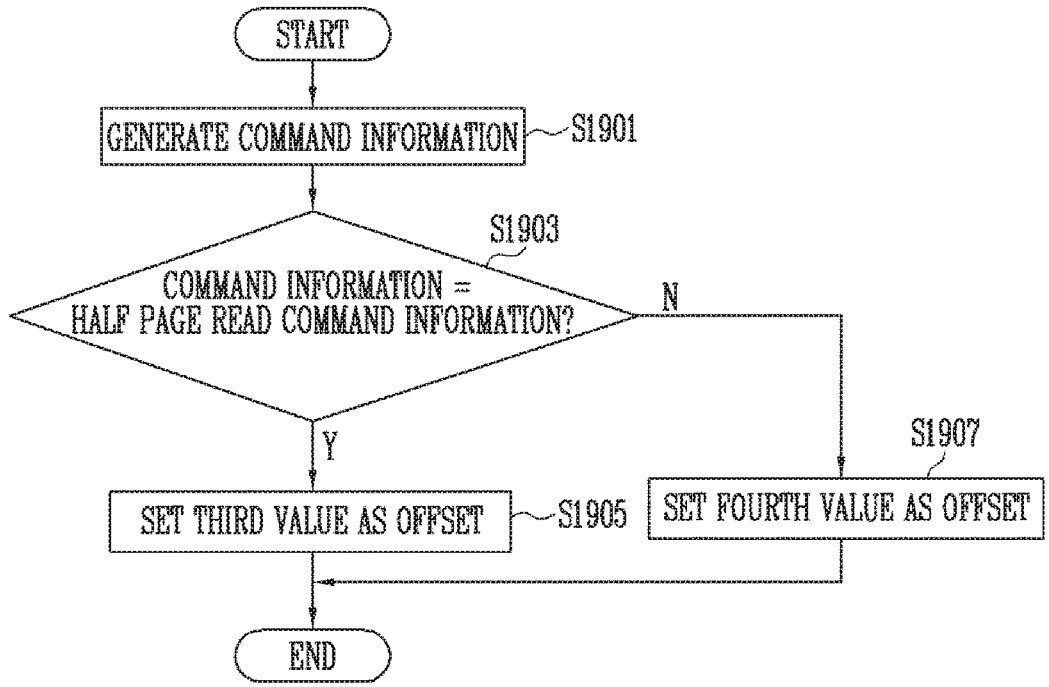
FIG. 19 is a flowchart illustrating the operation of the memory controller based on an embodiment of the disclosed technology.

FIG. 19 is a flowchart illustrating the operation of the memory controller based on an embodiment of the disclosed technology.

Referring to FIG. 19, at step S1901, a command analysis unit 221 may receive a command generated by a command generation unit 210, and may then generate command information CMD_INF indicating the type of read command for a selected page. The command information CMD_INF may include information corresponding to at least two of multi-plane read command information, single plane read command information, cache read command information, normal read command information, entire page read command information, and half page read command information.

At step S1903, whether the command information CMD_INF is half page read command information may be determined. The half page read command may be a command for reading any one of a first half page and a second half page included in the selected page. The first half page may include first memory cells, among memory cells included in the selected page, and the second half page may include second memory cells, among the memory cells included in the selected page.

When the command information CMD_INF is half page read command information, the process proceeds to step S1905. When the command information CMD_INF is not half page read command information, the process proceeds to step S1907. When the command information CMD_INF is not half page read command information, the command information CMD_INF may be entire page read command information.

At step S1905, the offset setting unit 223 may set a third value as an offset. The third value may vary depending on whether the half page read command information includes multi-plane read command information indicating that the read command is a command for reading pages included in two or more of the multiple planes, or single plane read command information indicating that the read command is a command for reading a page included in any one of the multiple planes. In detail, when the half page read command information includes the multi-plane read command information, the third value may be set to a value greater than that when the half page read command information includes the single plane read command information.

At step S1907, the offset setting unit 223 may set a fourth value as the offset. The fourth value may vary depending on whether the entire page read command information includes multi-plane read command information indicating that the read command is a command for reading pages included in two or more of the multiple planes, or single plane read command information indicating that the read command is a command for reading a page included in any one of the multiple planes. In detail, when the entire page read command information includes the multi-plane read command information, the fourth value may be set to a value greater than that when the entire page read command information includes the single plane read command information.

Figure 20:
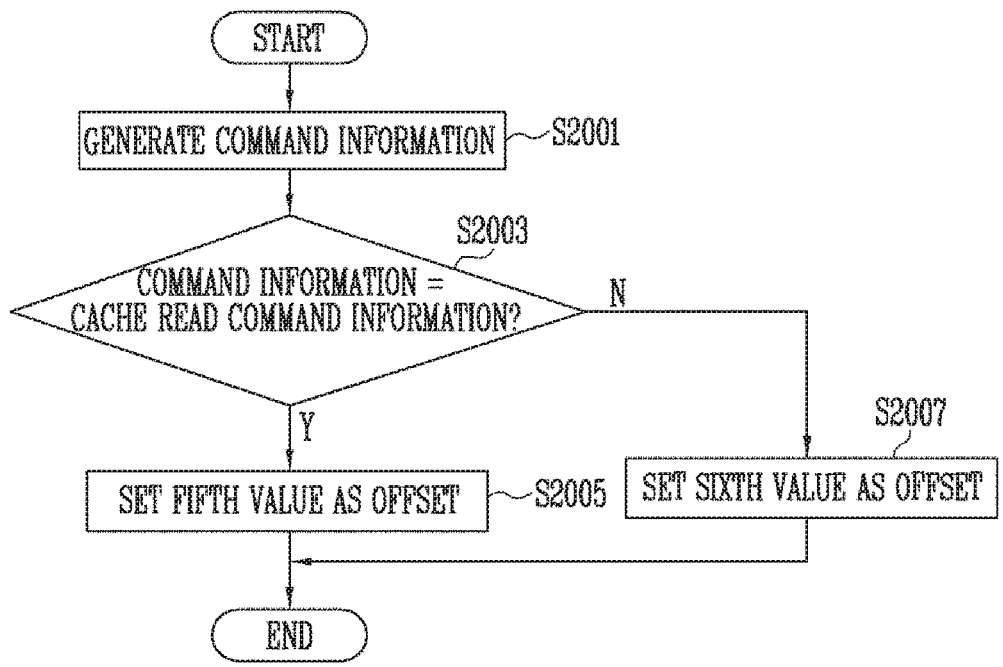
FIG. 20 is a flowchart illustrating the operation of the memory controller based on an embodiment of the disclosed technology.

FIG. 20 is a flowchart illustrating the operation of the memory controller based on an embodiment of the disclosed technology.

Referring to FIG. 20, at step S2001, a command analysis unit 221 may receive a command generated by a command generation unit 210, and may generate command information CMD_INF indicating the type of read command for a selected page. The command information CMD_INF may include information corresponding to at least two of multi-plane read command information, single plane read command information, cache read command information, normal read command information, entire page read command information, and half page read command information.

At step S2003, whether the command information CMD_INF is cache read command information may be determined. The cache read command information may be information indicating that the read command is a command for controlling the memory device 100 so that data in a selected page is stored in a page buffer PB while previous data is being output from a cache buffer to the memory controller 200.

When the command information CMD_INF is the cache read command information, the process proceeds to step S2005. When the command information CMD_INF is not cache read command information, the process proceeds to step S2007. When the command information CMD_INF is not cache read command information, the command information CMD_INF may be normal read command information.

At step S2005, the offset setting unit 223 may set a fifth value as the offset. The fifth value may vary depending on whether the cache read command information includes multi-plane read command information indicating that the read command is a command for reading pages included in two or more of the multiple planes, or single plane read command information indicating that the read command is a command for reading a page included in any one of the multiple planes. In detail, when the cache read command information includes the multi-plane read command information, the fifth value may be set to a value greater than that when the cache read command information includes the single plane read command information.

At step S2007, the offset setting unit 223 may set a sixth value as the offset. The sixth value may vary depending on whether the normal read command information includes multi-plane read command information indicating that the read command is a command for reading pages included in two or more of the multiple planes, or single plane read command information indicating that the read command is a command for reading a page included in any one of the multiple planes. In detail, when the normal read command information includes the multi-plane read command information, the sixth value may be set to a value greater than that when the normal read command information includes the single plane read command information.

Figure 21:
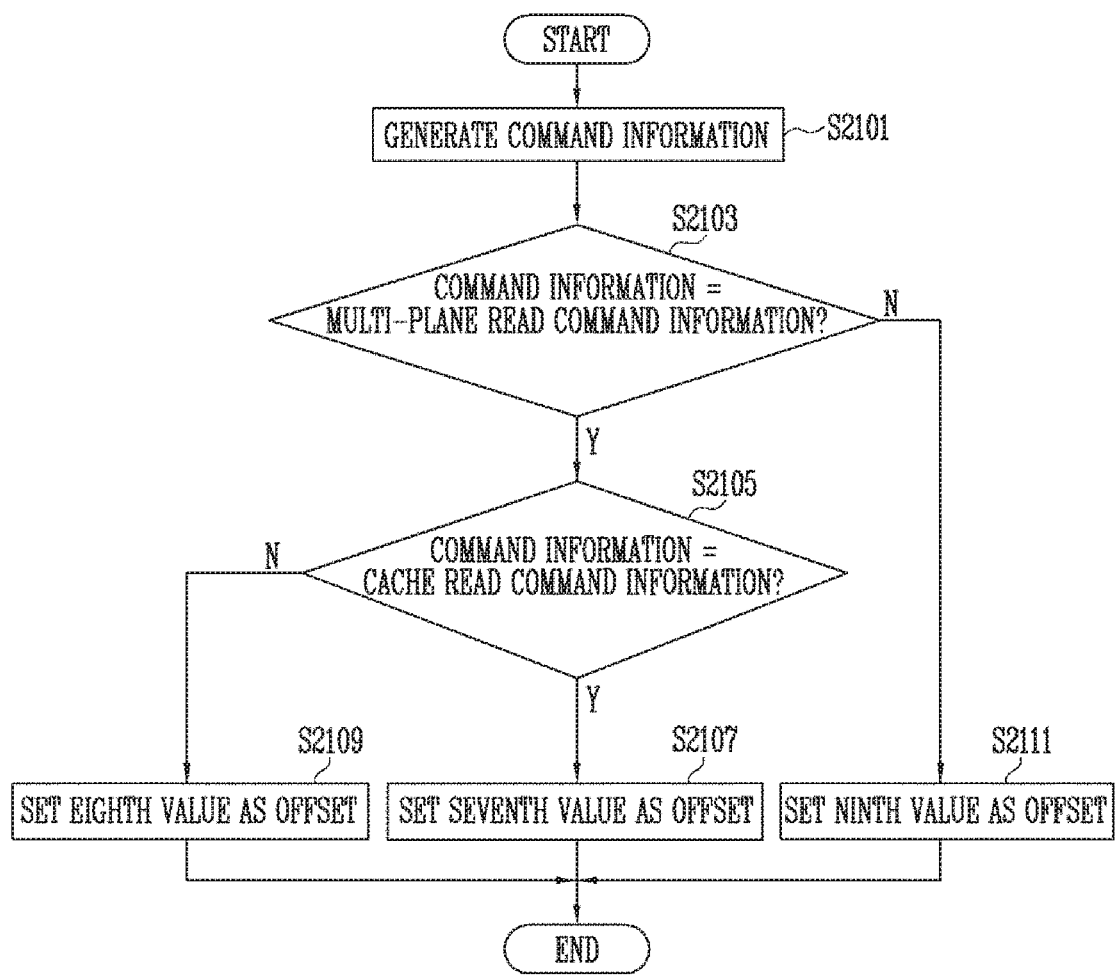
FIG. 21 is a flowchart illustrating the operation of the memory controller based on an embodiment of the disclosed technology.

FIG. 21 is a flowchart illustrating the operation of the memory controller based on an embodiment of the disclosed technology.

Referring to FIG. 21, at step S2101, a command analysis unit 221 may receive a command generated by a command generation unit 210, and may generate command information CMD_INF indicating the type of read command for a selected page. The command information CMD_INF may include information corresponding to at least two of multi-plane read command information, single plane read command information, cache read command information, normal read command information, entire page read command information, and half page read command information.

At step S2103, whether the command information CMD_INF is multi-plane read command information may be determined. The multi-plane read command information may be command information about a read operation performed on two or more of multiple planes.

When the command information CMD_INF is multi-plane read command information, the process proceeds to step S2105. When the command information CMD_INF is not multi-plane read command information, the process proceeds to step S2111. When the command information CMD_INF is not multi-plane read command information, the command information CMD_INF may be single plane read command information.

At step S2105, whether the command information CMD_INF is cache read command information may be determined. The cache read command information may be information indicating that the read command is a command for controlling the memory device 100 so that data in a selected page is stored in a page buffer PB while previous data is being output from a cache buffer to the memory controller 200.

When the command information CMD_INF is the cache read command information, the process proceeds to step S2107. When the command information CMD_INF is not cache read command information, the process proceeds to step S2109. When the command information CMD_INF is not cache read command information, the command information CMD_INF may be entire page read command information or half page read command information.

At step S2107, when the command information CMD_INF includes multi-plane read command information and cache read command information, a seventh value may be set as the offset. When the command information CMD_INF includes multi-plane read command information and cache read command information, a channel initialization time (CIT) for memory cells may be set to the longest time. Therefore, the seventh value may be set to the largest value among offset values.

At step S2109, when the command information CMD_INF includes the multi-plane read command information and any one of entire page read command information and half page read command information, an eighth value may be set as the offset. The eighth value that is set when the command information CMD_INF includes the entire page read command information may be greater than a value that is set when the command information CMD_INF includes half page read command information.

At step S2111, when the command information CMD_INF is single plane read command information, a ninth value may be set as the offset. The ninth value may vary depending on which type of information, among entire page read command information, half page read command information, and cache read command information, is included in single plane read command information. In detail, when the single plane read command information includes cache read command information, the largest value may be set as the ninth value. When the single plane read command information includes half page read command information, the smallest value may be set as the ninth value.

Figure 22:
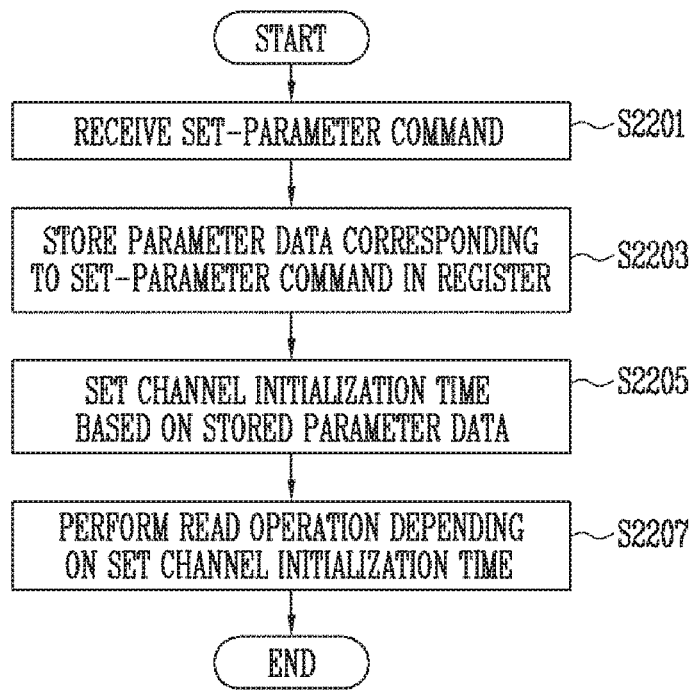
FIG. 22 is a flowchart illustrating the operation of a memory device based on an embodiment of the disclosed technology.

FIG. 22 is a flowchart illustrating the operation of the memory device based on an embodiment of the disclosed technology.

Referring to FIG. 22, at step S2201, the memory device 100 may receive a set-parameter command for setting a channel initialization time (CIT) for memory cells from a memory controller 200. The memory device 100 may store the channel initialization time information CIT_INF for memory cells as parameter data in response to the set parameter command.

At step S2203, the memory device 100 may store the parameter data in a register included in the memory device 100 in response to the set-parameter command. The memory device 100 may decide on the channel initialization time (CIT) for performing a read operation based on the parameter data. The parameter data may include channel initialization time information CIT_INF. The parameter data may include values related to channel initialization.

At step S2205, the memory device 100 may set the channel initialization time (CIT) based on the stored parameter data. The memory device may initialize the channels of the memory cells for the set channel initialization time (CIT) when a read operation is performed.

At step S2207, the memory device 100 may perform a read operation depending on the set channel initialization time (CIT). The set channel initialization time (CIT) may be the time obtained based on a preset default time and the offset. The channel initialization time (CIT) may be the time optimized for each read command.

Figure 23:
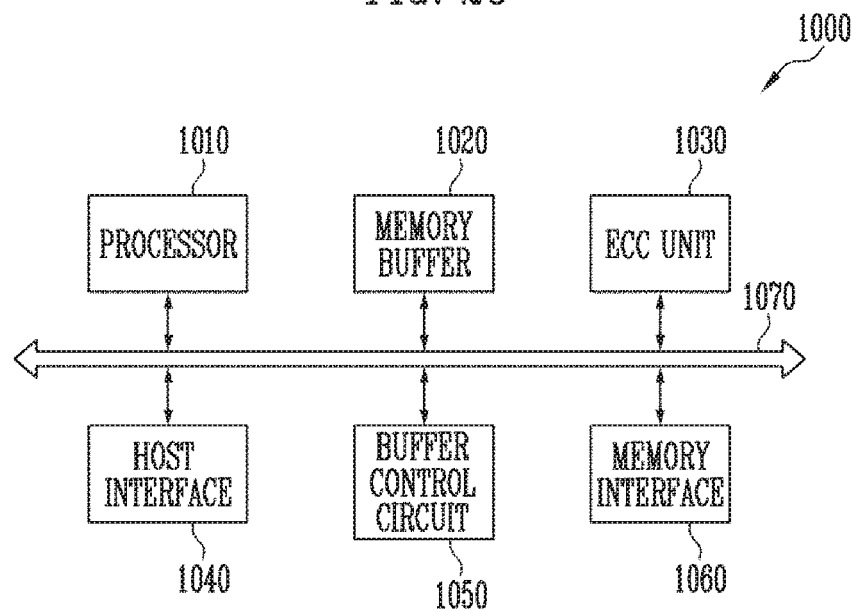
FIG. 23 is a diagram illustrating an example of a memory controller of FIG. 1.

FIG. 23 is a diagram illustrating an example of the memory controller of FIG. 1.

A memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

Referring to FIG. 23, the memory controller 1000 may include a processor 1010, a memory buffer 1020, an error checking and correction (ECC) unit 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processing unit 1010 may use a randomizing seed to randomize data received from the host. The randomized data may be provided, as data to be stored, to the memory device and may be programmed in the memory cell array.

The processor may derandomize data received from the memory device during a read operation. For example, the processor 1010 may derandomize the data received from the memory device using a derandomizing seed. The derandomized data may be output to the host.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC unit 1030 may perform error correction. The ECC unit 1030 may perform error correction code (ECC) encoding based on data to be written to the memory device through the memory interface 1060. The ECC-encoded data may be transferred to the memory device through the memory interface 1060. The ECC unit 1030 may perform ECC decoding based on data received from the memory device through the memory interface 1060. In an example, the ECC unit 1030 may be included as the component of the memory interface 1060 in the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, and may neither interfere with each other nor influence each other. The data bus may be coupled to the host interface 1040, the buffer control circuit 1050, the ECC unit 1030, and the memory interface 1060. The control bus may be coupled to the host interface 1040, the processor 1010, the buffer control circuit 1050, the memory buffer 1020, and the memory interface 1060.

Figure 24:
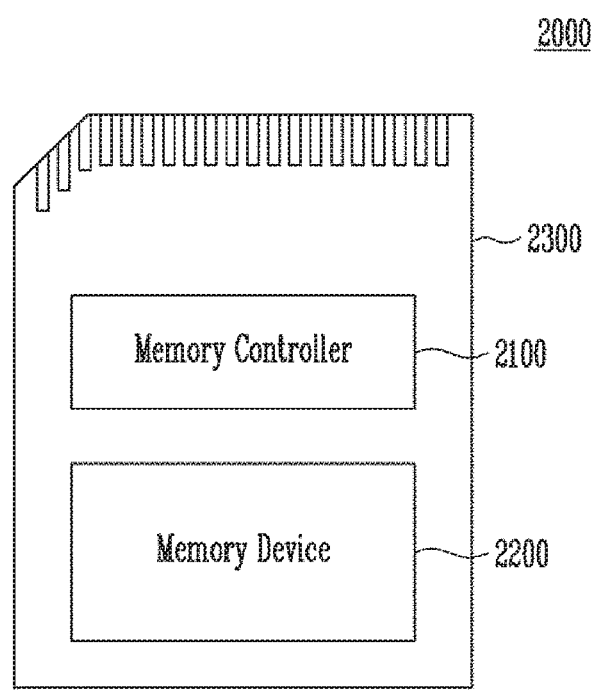
FIG. 24 is a block diagram illustrating a memory card system to which various embodiments of the disclosed technology is applied.

FIG. 24 is a block diagram illustrating a memory card system to which various embodiments of the disclosed technology is applied.

Referring to FIG. 24, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may be control read, write, erase, and background operations of the memory device 2200. The memory controller 2100 may provide an interface between the memory device 2200 and a host. The memory controller 2100 may run firmware for controlling the memory device 2200. The memory device 2200 may be implemented in the same way as the memory device 100 described above with reference to FIG. 4.

In an embodiment, the memory controller 2100 may include components, such as a RAM, a processing unit, a host interface, a memory interface, and an ECC unit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), a Spin-Torque Magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 25:
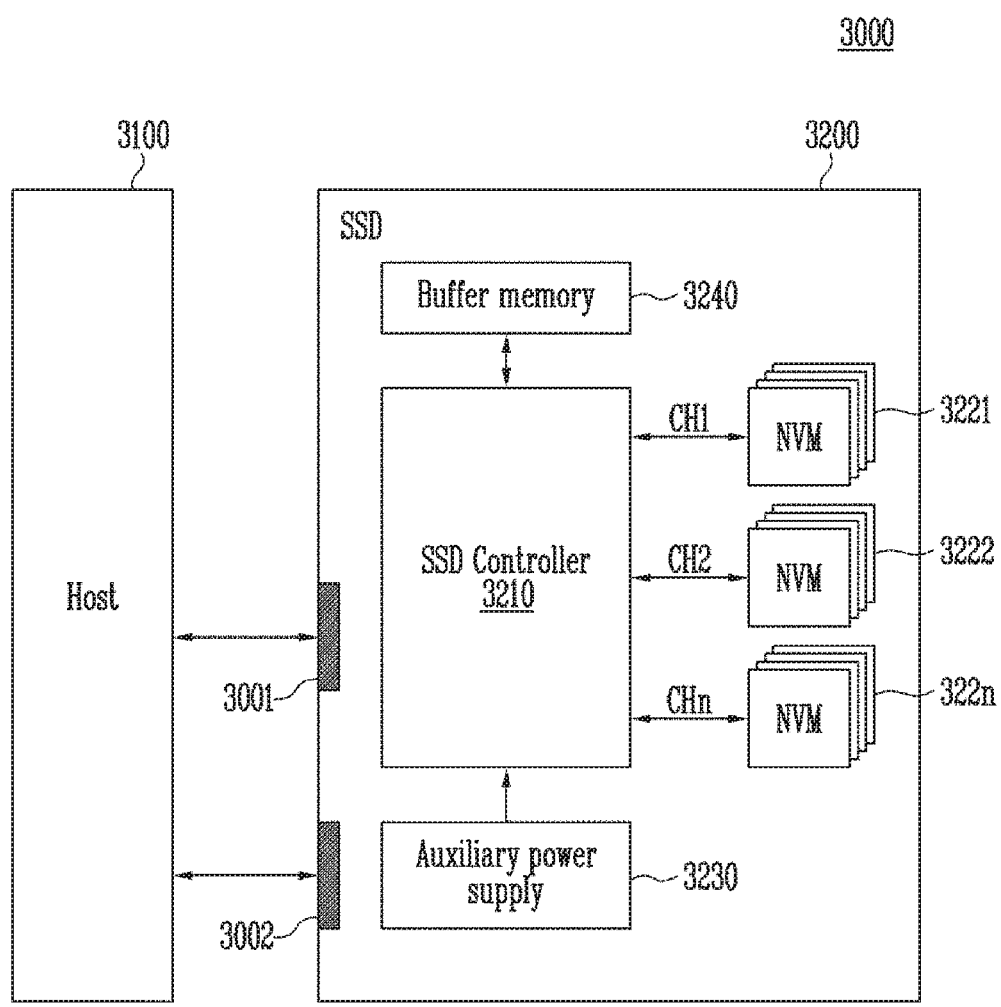
FIG. 25 is a block diagram illustrating an example of a solid state drive (SSD) system to which various embodiments of the disclosed technology is applied.

FIG. 25 is a block diagram illustrating an example of a solid state drive (SSD) system to which various embodiments of the disclosed technology is applied.

Referring to FIG. 25, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 26:
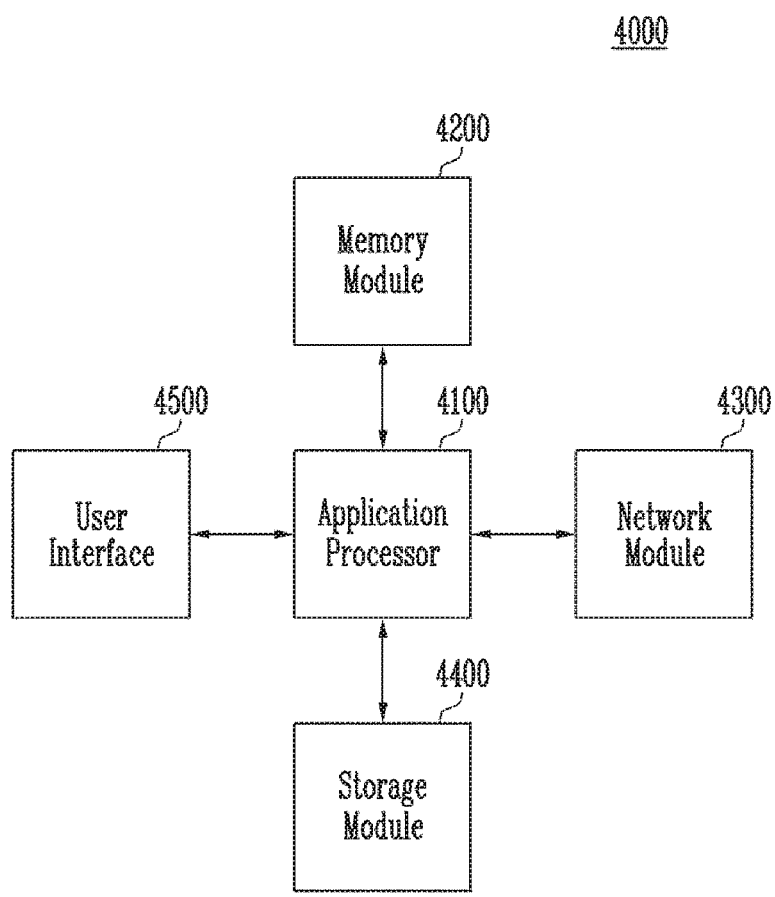
FIG. 26 is a block diagram illustrating a user system to which various embodiments of the disclosed technology is applied.

FIG. 26 is a block diagram illustrating a user system to which various embodiments of the disclosed technology is applied.

Referring to FIG. 26, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same way as the memory device described above with reference to FIGS. 4 to 7. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a motor.

In some embodiments of the disclosed technology, a storage device includes: one or more memory devices including a plurality of memory cells logically grouped into pages to store data, each of the plurality of memory cells including a channel to allow current to flow therethrough; one or more memory controllers in communication with the one or more memory devices to read the data from the plurality of memory cells, the one or more memory controllers including one or more instructions configured to be executed by the memory controller, including: instructions for issuing a read command to a selected memory device; instructions for determining a temperature of the selected memory device; instructions for determining whether a type of read operation executed by the read command is associated with a multi-plane operation or a single plane operation; instructions for determining whether a type of the read command is associated with a cache read, a page read, or a half page read; and instructions for adjusting a default channel initialization time based on the temperature, the type of read operation, and the type of read command.

In an implementation, the default channel initialization time may be set to the maximum possible channel initialization time. In another implementation, the default channel initialization time may be set to the minimum possible channel initialization time. The default channel initialization time is adjusted by an offset value determined based on the temperature, the type of read operation, and the type of read command, thereby selecting an optimal channel initialization time. When the type of read operation involves a multi-plane read operation, the optimal channel initialization time is longer than that of single plane read operations. When the type of read command involves a cache read operation, the optimal channel initialization time is longer than that of normal read operations. When the type of read command involves an entire page read operation, the optimal channel initialization time is longer than that of half page read operations.

There are provided a storage device, which performs an improved garbage collection operation, and a method of operating the storage device.

In accordance with the disclosed technology, there are provided a storage device having an improved operating speed and a method of operating the storage device.

While the exemplary embodiments of the present disclosure have been disclosed for illustrative purposes, those skilled in the art will appreciate that various modifications, additions and substitutions are possible. Therefore, the scope of the present disclosure must be defined by the appended claims and equivalents of the claims rather than by the description preceding them.

Although the embodiments of the present disclosure have been disclosed, those skilled in the art will appreciate that various modifications, additions and substitutions are possible, without departing from the scope and spirit of the present disclosure.

Therefore, the scope of the present disclosure must be defined by the appended claims and equivalents of the claims rather than by the description preceding them.

In the above-discussed embodiments, all steps may be selectively performed or skipped. In addition, the steps in each embodiment may not always be sequentially performed in given order, and may be randomly performed. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A memory controller for controlling a memory device that includes a plurality of memory cells including channel regions, wherein the memory device is configured to perform a read operation on selected memory cells among the plurality of memory cells, the memory controller comprising:
    a command generation unit configured to generate a read command corresponding to a request from a host;
    a command analysis unit configured to generate command information including information on a type of the read command in response to the read command received from the command generation unit; and
    an initialization time decision unit configured to determine a channel initialization time for discharging charges included in the channel regions of the selected memory cells during the read operation, according to the type of the read command corresponding to the command information received from the command analysis unit and control the memory device to perform a channel initialization operation for discharging the charges during the channel initialization time corresponding to the type of the read command in the read operation.

2. The memory controller according to claim 1, wherein:
    the memory device comprises multiple planes, each including a plurality of pages; and
    the type of the read command is one of a single plane read command for reading data stored in the selected memory cells included in a selected page among the plurality of pages included in a single plane and a multi-plane read command for reading the data stored in the selected memory cells included in the selected page among the plurality of pages included in multiple planes.

3. The memory controller according to claim 2, wherein the initialization time decision unit is configured to:
    determine a first time as the channel initialization time corresponding to the single plane read command; and
    determine a second time, which is longer than the first time, as the channel initialization time corresponding to the multi-plane read command.

4. The memory controller according to claim 1, wherein the memory device comprises a plurality of pages including a selected page, wherein the selected page comprises a first half page including first memory cells among the selected memory cells, and a second half page including second memory cells among the selected memory cells, and
    wherein the type of the read command is one of an entire page read command for reading data stored in both the first half page and the second half page and a half page read command for reading the data stored in any one of the first half page and the second half page.

5. The memory controller according to claim 4, wherein the initialization time decision unit is configured to:
    determine a third time as the channel initialization time corresponding to the entire page read command; and
    determine a fourth time, which is shorter than the third time, as the channel initialization time corresponding to the half page read command.

6. The memory controller according to claim 1, wherein the memory device comprises a plurality of pages including a selected page,
    wherein the type of the read command is one of a cache read command and a normal read command, wherein:
    the cache read command is for moving second data from the selected page including the selected memory cells to a page buffer of the memory device while first data is being output from a cache buffer of the memory device to the memory controller; and
    the normal read command is for moving the second data from the selected page including the selected memory cells to the page buffer after the first data has been output from the page buffer to the memory controller.

7. The memory controller according to claim 6, wherein the initialization time decision unit is configured to:
    determine a fifth time as the channel initialization time corresponding to the cache read command, and
    determine a sixth time, which is shorter than the fifth time, as the channel initialization time corresponding to the normal read command.

8. The memory controller according to claim 1, wherein the initialization time decision unit comprises:
    an offset setting unit configured to set an offset for determining the channel initialization time for the plurality of memory cells based on the command information; and
    a parameter setting unit configured to generate information on the channel initialization time for the plurality of memory cells based on the offset.

9. The memory controller according to claim 8, wherein the offset setting unit is configured to:
    store an offset table including different offsets corresponding to types of the read command; and
    select an offset corresponding to received command information, from among the offsets included in the offset table, and provide the selected offset to the parameter setting unit.

10. The memory controller according to claim 8, wherein the offset setting unit is configured to:
    store an offset table including different offsets corresponding to a plurality of temperature ranges; and select an offset corresponding to a temperature of the memory device on which the read operation is performed from among the offsets included in the offset table, and provide the selected offset to the parameter setting unit.

11. The memory controller according to claim 8, wherein the parameter setting unit generates the information on the channel initialization time based on a preset default time and the offset received from the offset setting unit, and provides the generated information on the channel initialization time as parameter data to the memory device.

12. A method of operating a memory controller, the memory controller controlling a memory device including a plurality of memory cells including channel regions therein and performing a read operation on selected memory cells among the plurality of memory cells, the method comprising:
    generating a read command corresponding to a request from a host;
    generating information on a channel initialization time for discharging charges included in the channel regions of the selected memory cells during the read operation, according to a type of the read command;
    providing the information on the channel initialization time to the memory device; and
    controlling the memory device to perform a channel initialization operation for discharging the charges during the channel initialization time corresponding to the type of the read command in the read operation based on the information on the channel initialization time.

13. The method according to claim 12, wherein:
    the memory device comprises multiple planes, each including a plurality of pages; and
    generating the information on the channel initialization time includes:
    determining a first time as the channel initialization time corresponding to a single plane read command for reading data stored in the selected memory cells included in a selected page among the plurality of pages included in a single plane; and
    determining a second time, which is longer than the first time, as the channel initialization time corresponding to a multi-plane read operation command for reading the data stored in the selected memory cells included in the selected page among the plurality of pages included in at least two planes.

14. The method according to claim 12, wherein:
    the memory device comprises a plurality of pages including a selected page, and
    the selected page comprises a first half page including first memory cells among the selected memory cells, and a second half page including second memory cells among the selected memory cells; and
    wherein the type of the read command is one of an entire page read command for reading data stored in both the first half page and the second half page and a half page read command for reading the data stored in any one of the first half page and the second half page.

15. The method according to claim 14, wherein deciding on generating the information on the channel initialization time includes:
    determining a third time as the channel initialization time corresponding to the entire page read command; and
    determining a fourth time, which is shorter than the third time, as the channel initialization time corresponding to the half page read command.

16. The method according to claim 12, wherein the memory device comprises a plurality of pages including a selected page,
    wherein the type of the read command is one of a cache read command and a normal read command, wherein the cache read command is for moving second data from the selected page including the selected memory cells to a page buffer of the memory device while first data is being output from a cache buffer of the memory device to the memory controller, and the normal read command is for moving the second data from the selected page including the selected memory cells to the page buffer after the first data has been output from the page buffer to the memory controller.

17. The method according to claim 16, wherein deciding on generating the information on the channel initialization time includes:
    determining a fifth time as the channel initialization time corresponding to the cache read command; and
    determining a sixth time, which is shorter than the fifth time, as the channel initialization time corresponding to the normal read command.

18. The method according to claim 12, further comprising:
    setting an offset for determining the channel initialization time for the plurality of memory cells based on the type of the read command; and
    generating the information on the channel initialization time for the plurality of memory cells based on the offset.

19. The method according to claim 18, further comprising providing the information on the channel initialization time as parameter data to the memory device.

20. A storage device storing data in selected memory cells including channel regions therein, comprising:
    a memory controller configured to generate a read command for reading the data and information on a channel initialization time of discharging charges included in the channel regions of the selected memory cells during a read operation corresponding to the read command, according to a type of the read command; and
    a memory device including the selected memory cells configured to perform a channel initialization operation for discharging the charges during the channel initialization time corresponding to the type of the read command in the read operation based on the information on the channel initialization time provided by the memory controller.

* * * * *